us009670304B2

United States Patent
Wang et al.

(10) Patent No.: US 9,670,304 B2
(45) Date of Patent: *Jun. 6, 2017

(54) COMPOSITE FOR PREVENTING ICE ADHESION

(71) Applicants: Liang Wang, Acworth, GA (US); Viktoria Ren Wang, Atlanta, GA (US)

(72) Inventors: Liang Wang, Acworth, GA (US); Viktoria Ren Wang, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/669,131

(22) Filed: Nov. 5, 2012

(65) Prior Publication Data

US 2014/0127516 A1    May 8, 2014

(51) Int. Cl.
*C09K 3/18* (2006.01)
*B05D 5/00* (2006.01)
*C08G 18/06* (2006.01)
*C08J 7/04* (2006.01)

(52) U.S. Cl.
CPC .............. *C08G 18/06* (2013.01); *C08J 7/042* (2013.01); *C08J 7/047* (2013.01); *C08J 2483/04* (2013.01); *Y10T 428/31544* (2015.04); *Y10T 428/31573* (2015.04); *Y10T 428/31663* (2015.04)

(58) Field of Classification Search
CPC ....... C08G 18/06; C08J 2483/04; C08J 7/042; C08J 7/047; Y10T 428/3154; Y10T 428/31544; Y10T 428/31573; Y10T 428/31598; Y10T 428/31663
USPC .............................. 428/421, 425.5, 447, 451
See application file for complete search history.

(56) References Cited

U.S. PATENT DOCUMENTS

| | | | |
|---|---|---|---|
| 6,468,642 B1 * | 10/2002 | Bray et al. ..................... | 428/216 |
| 2006/0189750 A1 * | 8/2006 | Maier et al. .................. | 524/589 |
| 2014/0113144 A1 * | 4/2014 | Loth et al. .................... | 428/421 |
| 2014/0187666 A1 * | 7/2014 | Aizenberg et al. ........... | 523/113 |
| 2014/0234579 A1 * | 8/2014 | Wang et al. .................. | 428/141 |

\* cited by examiner

*Primary Examiner* — Thao T Tran

(57) ABSTRACT

The present invention relates to a novel composite for preventing ice adhesion. A superhydrophobic or superhydrophilic surface with a hydrophobic, low freezing point liquid adsorbed onto surface asperities results in a durable, renewable anti-icing surface. The preparation method for novel icing and rain protecting surface is disclosed.

12 Claims, No Drawings

COMPOSITE FOR PREVENTING ICE ADHESION

U.S PATENT DOCUMENTS

| Patent No. | Date | Inventor | Class |
|---|---|---|---|
| U.S. Pat. No. 8,241,508 | Aug. 14, 2012 | D'Urso. Et al | 216/11 |
| U.S. Pat. No. 8,236,379 | Aug. 7, 2012 | Kobrin, et al | 427/248.1 |
| U.S. Pat. No. 8,221,847 | Jul. 17, 2012 | Carter | 427/407.1 |
| U.S. Pat. No. 8,216,674 | Jul. 10, 2012 | Simpson, et al | 428/403 |
| U.S. Pat. No. 8,211,969 | Jul. 8, 2012 | Zou, et al | 524/496 |
| U.S. Pat. No. 8,202,620 | Jun. 19, 2012 | Simon, et al | 428/442 |
| U.S. Pat. No. 8,202,614 | Jun. 19, 2012 | Koene, et al | 428/403 |
| U.S. Pat. No. 8,193,294 | Jun. 5, 2012 | Hu, et al | 528/31 |
| U.S. Pat. No. 8,187,707 | May 29, 2012 | Van Benthem, et al | 428/403 |
| U.S. Pat. No. 8,153,233 | Apr. 10, 2012 | Sheng, et al. | 428/141 |
| U.S. Pat. No. 8,147,607 | Apr. 3, 2012 | Baumgart, et al | 106/287.32 |
| U.S. Pat. No. 8,137,751 | Mar. 20, 2012 | Bhushan, et al | 727/265 |
| U.S. Pat. No. 8,067,059 | Nov. 29, 2011 | Birger, et al | 427/204 |
| U.S. Pat. No. 8,043,654 | Oct. 25, 2011 | Russell, et al | 427/154 |
| U.S. Pat. No. 8,017,234 | Sep. 13, 2011 | Jin, et al | 428/376 |
| U.S. Pat. No. 7,998,554 | Aug. 16, 2011 | Wang, et al | 428/143 |
| U.S. Pat. No. 7,985,475 | Jul. 26, 2011 | Dubrow, et al | 428/359 |
| U.S. Pat. No. 7,985,451 | Jul. 26, 2011 | Luzinov, et al | 427/258 |
| U.S. Pat. No. 7,968,187 | Jun. 28, 2011 | Chinn, et al | 428/339 |
| U.S. Pat. No. 7,943,234 | May 17, 2011 | Lawin, et al | 428/323 |
| U.S. Pat. No. 7,915,371 | Mar. 29, 2011 | Byrd, et al | 528/26 |
| U.S. Pat. No. 7,914,897 | Mar. 29, 2011 | Zimmermann, et al | 428/447 |
| U.S. Pat. No. 7,910,683 | Mar. 22, 2011 | Byrd, et al | 528/26 |
| U.S. Pat. No. 7,897,667 | Mar. 1, 2011 | Mabry, et al | 524/269 |
| U.S. Pat. No. 7,754,279 | Jul. 13, 2010 | Simpson, et al | 427/203 |
| U.S. Pat. No. 7,722,951 | May 25, 2010 | Li, et al | 428/379 |
| U.S. Pat. No. 7,704,608 | Apr. 27, 2010 | Thies, et al | 428/515 |
| U.S. Pat. No. 7,695,767 | Apr. 13, 2010 | Strauss | 427/299 |
| U.S. Pat. No. 7,491,628 | Feb. 17, 2009 | Noca, et al | 438/493 |
| U.S. Pat. No. 7,485,343 | Feb. 3, 2009 | Branson, et al | 427/335 |
| U.S. Pat. No. 7,419,615 | Sep. 2, 2008 | Strauss | 216/83 |
| U.S. Pat. No. 7,261,768 | Aug. 28, 2007 | Luten, et al | 106/287.14 |
| U.S. Pat. No. 7,258,731 | Aug. 21, 2007 | D'Urso, et al | 106/2 |
| U.S. Pat. No. 7,253,130 | Aug. 7, 2007 | Chiang, et al | 502/4 |
| U.S. Pat. No. 7,211,605 | May 1, 2007 | Coronado, et al | 516/100 |
| U.S. Pat. No. 7,202,321 | Apr. 1, 2007 | Byrd, et al | 528/26 |
| U.S. Pat. No. 7,150,904 | Dec. 19, 2006 | D'Urso, et al | 428/116 |
| U.S. Pat. No. 6,809,169 | Oct. 26, 2004 | Byrd, et al | 528/28 |
| U.S. Pat. No. 6,797,795 | Sep. 28, 2004 | Byrd | 528/26 |
| U.S. Pat. No. 6,743,467 | Jun. 1, 2004 | Jones, et al | 427/180 |
| U.S. Pat. No. 6,733,892 | May 11, 2004 | Yoneda, et al | 428/447 |
| U.S. Pat. No. 6,702,953 | Mar. 9, 2004 | Simendinger, et al | 252/70 |
| U.S. Pat. No. 6,649,222 | Nov. 18, 2003 | D'Agostino, et al | 427/490 |
| U.S. Pat. No. 6,579,620 | Jun. 17, 2003 | Mizuno, et al | 428/447 |
| U.S. Pat. No. 6,486,245 | Nov. 26, 2002 | Thunemann, et al | 524/130 |
| U.S. Pat. No. 6,432,486 | Aug. 13, 2002 | Paris, et al | 427/447 |
| U.S. Pat. No. 6,395,345 | May 28, 2002 | S.o slashed.rensen | 427/475 |
| U.S. Pat. No. 6,362,135 | Mar. 26, 2002 | Greer | 508/113 |
| U.S. Pat. No. 6,183,872 | Feb. 6, 2001 | Tanaka, et al | 428/429 |
| U.S. Pat. No. 6,153,304 | Nov. 28, 2000 | Smith, et al | 428/447 |
| U.S. Pat. No. 6,114,448 | Sep. 5, 2000 | Derbes | 525/104 |
| U.S. Pat. No. 6,114,446 | Sep. 5, 2000 | Narisawa, et al | 525/104 |
| U.S. Pat. No. 6,084,020 | Jul. 4, 2000 | Smith, et al | 524/501 |
| U.S. Pat. No. 6,068,911 | May 30, 2000 | Shouji, et al | 428/143 |
| U.S. Pat. No. 5,904,959 | May 18, 1999 | Martin | 427/256 |
| U.S. Pat. No. 5,747,561 | May 5, 1998 | Smirnov, et al | 523/212 |
| U.S. Pat. No. 5,736,249 | Apr. 4, 1998 | Smith, et al | 428/447 |
| U.S. Pat. No. 5,565,714 | Jane 21, 1986 | Koshar | 427/515 |
| U.S. Pat. No. 5,336,715 | Aug. 9, 1994 | Seipka, et al | 524/765 |
| U.S. Pat. No. 5,294,252 | Mar. 15, 1994 | Gun | 106/287.13 |
| U.S. Pat. No. 5,188,750 | Feb. 23, 1993 | Kogue, et al | 252/70 |
| U.S. Pat. No. 5,187,015 | Feb. 16, 1993 | Yorkgitis, et al | 428/447 |
| U.S. Pat. No. 5,075,378 | Dec. 24, 1991 | Smierciak, et al | 525/109 |
| U.S. Pat. No. 5,045,599 | Sep. 3, 1991 | Murase | 525/102 |
| U.S. Pat. No. 5,008,135 | Apr. 16, 1991 | Giordano, et al | 427/386 |
| U.S. Pat. No. 4,774,112 | Sep. 27, 1988 | Achtenberg, et al | 427/387 |
| U.S. Pat. No. 4,301,208 | Nov. 17, 1981 | Jellinek, et al | 428/334 |
| U.S. Pat. No. 3,931,429 | Jane 6, 1976 | Reick | 428/149 |

OTHER REFERENCES

[1] Silicon-Containing Polymers: The Science and Technology of Their Synthesis and Applications, Jones, R. G., Ando, W., & Chojnosski, J., Kjuwer Academic Publisher, 2000

[2] Modern Fluoropolymers, High Performance Polymers for Diverse Applications, Scheirs, J., John Wiley & Sons, 1997

[3] Tests of the Performance of Coatings for Low Ice Adhesion, D. N. Anderson, NASA Lewis Research Center, Cleveland Ohio and A.D. Reich, BF Goodrich R&D Center, Brecksville, Ohio, AIAA-97-0303, 35$^{th}$ Aerospace Sciences Meeting & Exhibit, Jan. 6-10, 1997/Reno, Nev.

[4] Anti-icing performance of superhydrophobic surfaces, S. Farhadi, M. Farzaneh and S. A. Kulinich, Appl. Sur. Sci., 257(14) 6264 (2011)

[5] Raster-Elekronenmikroskopie der Epidermis-Oberflachen von Spermatophyten, Barthlott, Wilhelm, Ehler, N. Tropishe and Subtropishe Pflanzenwelt (Akad, Wiss. Lit. Mainz) 19, 110, 1977

[6] Superhydrophobic Surfaces, Cane, A & Mittal, K. L. (2009)

[7] Micro- and Nanostructured Multiphase Polymer Blend Systems: Phase Morphology and Interfaces, Editor: Charef Harrats, Sabu Thomas, Gabriel Groeninckx (2005) CRC Taylor & Trancis,

[8] Phase-Separated Interpenetrating Polymer Networks (Advances in Polymer Science 208) by Yuri S. Lipatov and Tatiana Alekseeva (2010), Springer

TECHNICAL FIELD OF THE INVENTION

The present invention relates to a novel composite for preventing ice adhesion. A superhydrophobic or superhydrophilic surface with a hydrophobic, low freezing point liquid adsorbed onto surface asperities results in a durable, renewable anti-icing surface. The preparation method for the novel anti-icing and rain repelling protecting surface is disclosed.

BACKGROUND OF THE INVENTION

A composite for preventing ice adhesion or for facilitating the removal of ice, snow, and frozen contaminants is desirable. The application fields are very broad, encompassing critical areas such as aircraft, vehicles, marine, wind turbine, and electric power cables. For example, in the absence of ice nuclei, supercooled water droplets will remain in the liquid form down to −40° C., such as in stratiform and cumuli clouds. Flying though such clouds, aircraft will seed these droplets, causing abrupt icing on exposed surfaces. In-flight icing causes many tragic accidents.

Anti-icing method utilizing freezing-point depressant solution absorbed into a hydrophilic 50% porous polymer matrix are known in the art, such as U.S. Pat. No. 8,221,847, among others. Many low surface energy materials, such as silicon-containing polymers [1], fluoropolymers [2] and their composites are claimed as anti-icing coatings, examples include: U.S. Pat. No. 8,202,620, U.S. Pat. No. 8,193,294, U.S. Pat. No. 7,897,667, U.S. Pat. No. 7,915,371, U.S. Pat. No. 7,910,683, U.S. Pat. No. 7,261,768, U.S. Pat. No. 7,261,768, U.S. Pat. No. 7,202,321, U.S. Pat. No. 6,809,169, U.S. Pat. No. 6,797,795, U.S. Pat. No. 6,733,892, U.S. Pat. No. 6,579,620, U.S. Pat. No. 6,432,486, U.S. Pat. No. 6,395,345, U.S. Pat. No. 6,363,135, U.S. Pat. No. 6,183,872, U.S. Pat. No. 6,153,304, U.S. Pat. No. 6,114,448, U.S. Pat. No. 6,084,020, U.S. Pat. No. 6,068,911, U.S. Pat. No. 5,904,959, U.S. Pat. No. 5,747,561, U.S. Pat. No. 5,736,249, U.S. Pat. No. 5,336,715, U.S. Pat. No. 5,188,750, U.S. Pat. No. 5,187,015, U.S. Pat. No. 5,075,378, U.S. Pat. No. 5,045,599, U.S. Pat. No. 5,008,135, U.S. Pat. No. 4,565,714, and U.S. Pat. No. 4,301,208.

The NASA Lewis Research Center, which operates the world's largest refrigerated Icing Research Tunnel (IRT), has performed icing research for over 50 years. The studies conducted by NASA [3] and other researchers have concluded that fluoropolymers, siloxane resins, their composites, as surface coatings are inadequate for anti-icing applications [3]. For example, repeated ice removal or rain erosion is shown to increase ice adhesion on silicone surfaces [3].

Superhydrophobic nano-micron hierarchical structures of lotus leaves have been studied since 1977 [5]. Various approaches for mimicking the surface topography and surface chemistry of lotus leaves have been attempted, resulting in the launch of biommimetic products [6]. The main methods developed so far have been: 1) layer-by-layer assembly, 2) polymer film roughening, 3) chemical vapor deposition, 4) sol-gel process, 5) phase separation, 6) hydrothermal synthesis, and 7) coating with composites of nanoparticles. The following are typical examples of US patents that are related to superhydrophobic coatings: U.S. Pat. No. 8,241,508, U.S. Pat. No. 8,236,379, U.S. Pat. No. 8,216,674, U.S. Pat. No. 8,211,969, U.S. Pat. No. 8,202,614, U.S. Pat. No. 8,187,707, U.S. Pat. No. 8,153,233, U.S. Pat. No. 8,147,607, U.S. Pat. No. 8,137,751, U.S. Pat. No. 8,067,059, U.S. Pat. No. 8,043,654, U.S. Pat. No. 8,017,234, U.S. Pat. No. 7,998,554, U.S. Pat. No. 7,985,475, U.S. Pat. No. 7,985,451, U.S. Pat. No. 7,968,187, U.S. Pat. No. 7,943,234, U.S. Pat. No. 7,914,897, U.S. Pat. No. 7,754,279, U.S. Pat. No. 7,722,951, U.S. Pat. No. 7,704,608, U.S. Pat. No. 7,695,767, U.S. Pat. No. 7,485,343, U.S. Pat. No. 7,419,615, U.S. Pat. No. 7,291,628, U.S. Pat. No. 7,258,731, U.S. Pat. No. 7,253,130, U.S. Pat. No. 7,211,605, U.S. Pat. No. 7,150,904, U.S. Pat. No. 6,743,467, U.S. Pat. No. 6,649,222, U.S. Pat. No. 3,391,428

However, superhydrophobic surfaces do not always show low ice adhesion properties. Secondly, their anti-icing properties deteriorate from repeated icing/de-icing cycles due to the destruction of very thin and fragile nano/micron hierarchical structures. Thirdly, prolonged exposure to high humidity levels leads to high ice bonding forces due to ice forming in and getting trapped into inter-asperity spaces [4]. Other factors, such as technical complexity of production and scale-up difficulties hinder application in the real world.

SUMMARY OF THE INVENTION

Accordingly, the primary objective of this invention is to provide a renewable anti-icing composite which addresses these problems.

Researches discover that supercooled water slides off silicone fluid surfaces when the surface is tilted due to low hysteresis and a lack of crystallization centers on hydrophobic liquid surfaces.

It is highly desirable to use a hydrophobic liquid in a composite surface for protection against icing as it can delay ice formation, reduce ice adhesion strength, facilitate ice removal, and provide renewable surfaces.

It is known that silicone fluids reduce the adhesion of ice initially; however, silicone fluid will be stripped away from surface quickly with each icing/de-icing cycle. Thus, as the silicone fluid is removed, the ice adhesion forces increase abruptly.

Generally, if water contact angle is greater than 150°, the material is superhydrophobic. If water contact angle is near zero degree, the material is superhydrophilic.

It is known that superhydrophobic properties are based on the Cassie-Baxter state: (1) contact line forces overcome body forces of unsupported water drop weight and (2) microstructures are tall enough to prevent the water that bridges on top of microstructures from touching the base of microstructures. Superhydrophobic properties change to superhydrophilic properties when switching to a higher energy surface while maintaining the same surface texture and morphology. For example, a lotus leaf exhibits superhydrophilic properties when its surface is contaminated with a surfactant.

It is unexpected that when a superhydrophobic or superhydrophilic surface is wetted with a hydrophobic liquid, its original superhydrophobic or superhydrophilic properties disappear, the inter-asperity spaces of the superhydrophobic or superhydrophilic surface provide a reservoir for said hydrophobic liquid, and its surface properties become determined solely by said hydrophobic liquid contained within the inter-asperity spaces.

The advantage of utilizing superhydrophobic or superhydrophilic surfaces as liquid reservoir is that ice/hydrophobic liquid contact areas are minimized, thus minimizing the amounts of hydrophobic liquid lost with each icing/ice removal cycles.

It is unexpected that a novel superhydrophobic surface with the internal surfaces between asperities adsorbed with a hydrophobic liquid will show ice-phobic properties.

It is unexpected that its ice phobic properties do not shown noticeable decrease with repeated icing/ice removal cycles.

It is unexpected that ice splits apart from the surface of novel anti-icing composite upon freezing even when the surface is in a horizontal position.

One of the main objectives of the invention is to provide a preparation method for producing a durable superhydrophobic surface that acts as a reservoir for a hydrophobic liquid, resulting in an anti-icing composite.

It is unexpected that a superhydrophilic surface is obtained when using the same method to produce superhydrophobic surfaces but with a different hydrophobic material.

It is unexpected that the novel anti-icing composite having hydrophobic liquid-adsorbed asperities on its superhydrophilic surface also shows ice-phobic properties.

One of the primary objectives of this invention is to select a hydrophobic liquid with low freezing point for its novel anti-icing composite.

Another primary objective of the invention is to provide a preparation method for producing durable superhydrophobic or superhydrophilic surfaces that is scalable for large-area fabrication of durable and robust anti-icing composites.

Another objective of the invention is to select suitable materials for the preparation of the novel anti-icing composite.

DETAILED DESCRIPTION OF THE INVENTION

A durable, renewable icing protection surface with near zero or zero ice adhesion is currently unknown. The present invention relates to a durable renewable anti-icing surface with near zero or zero ice adhesion. The novel anti-icing surface repels water, delays ice formation, eliminates ice adhesion, or facilitates the splitting apart of ice from treated surfaces. Mechanically durable, easily fabricated, superhydrophobic or superhydrophilic surfaces with reservoirs for hydrophobic, low freezing point liquids are currently unknown. Freezing point is characterized by the temperature at which liquid phase changes into solid phase. Pour point is the lowest temperature at which the liquid can flow. For a given liquid, its freezing point is related with its pour point.

The present invention relates to a composite of novel superhydrophobic or superhydrophilic surface having a hydrophobic, low freezing point liquid adsorbed onto the asperity surface of the composite that provides mechanical durability and robustness, renewability, and feasibility for large-area fabrication on complex substrates.

Phase separation are known art [7, 8], however, it is unexpected that a novel superhydrophobic surface results from Phase Separation Morphology (PSM) structure of Interpenetrating Polymer Network (IPN) of hydrophobic immiscible fluoroolefin powder-hydrophobic polymer blends.

It is unexpected that a novel superhydrophobic coating results from PSM structures of IPN containing fluoroolefin powder-hydrophobic fluorocopolymer.

It is unexpected that novel icephobic coating results from morphology memory, self-assembly of PSM of simultaneous IPN driven by catalytic chemical reaction front having a composition containing fluoroolefin powder-reactive fluorinated copolymer coated on elastic substrate.

The present invention discovered that the novel anti-icing composite shows near zero ice adhesion or high anti-icing ability as measured by the force necessary for ice removal per unit of surface area.

Since certain anti-icing applications for aircraft, wind turbines, high voltage electric power lines, and marine structures require long-term resistance toward UV and weathering, it is highly desirable to utilize aliphatic polymers, fluorine-containing polymers and polysiloxanes because they are UV and weathering resistant.

The reaction between an isocyanato (—N=C=O) group and a hydroxyl (—OH) group forms a urethane (carbamate) (—O—CO—NH—) link. Polyurethane is a polymer composed of at least one urethane (carbamate) link. The reaction between an isocyanato (—N=C=O) group and an amino (—NHR—) group forms a urea (—NH—CO—NR—) link (R=H or organic moiety). Polyurea is a polymer composed of at least one urea link. It is highly desirable to utilize urethane and/or urea segments because urethane and/or urea bonds are chemically stable and can be formed under ambient or low temperature.

Since certain anti-icing applications for aircraft, helicopters, and wind turbines require tong-lasting resistance toward rain and sand erosion, it is highly desirable to utilize elastomeric polyurethane and elastomeric polyurea coating because they show resistance toward rain and sand erosion.

The present invention discovered that a mixture of powder (a plurality of powder) of fluoroolefin polymer dispersed with a fluorinated polyol can form a novel fluoroolefin polymer powder-fluorinated polyurethane coating on a rigid or flexible substrate after reacting with polyfunctional isocyanate. A novel fluoroolefin polymer powder-fluorinated polyamine blend can form a novel fluoropolymer powder-fluorinated polyurea coating on a rigid or flexible substrate after reacting with polyfunctional isocyanate.

A preferred fluoroolefin polymer in present invention is homopolymerization or copolymerization product of fluoroolefin. The monomer fluoroolefin is selected from the group consisting of tetrafluoroethylene (TFE), hexafluoropropylene (HFP), hexafluoroisobutylene (HFIB), vinylidene fluoride (VDF), difluoroethylene (DFE), trifluoroethylene (TFE), 3,3,3-trifluoropropene (TFP), 2,3,3,3-tetrafluoropropene, 1,2,3,3,3-pentafluoropropene, chlorotrifluoroethylene (CTFE), perfluoroalkyl vinyl ether (PAVE), hexafluoropropylene oxide, hydropentafluoropropylene, perfluoromethyl vinyl ether, perfluoromethoxyvinyl ether, perfluoropropyl vinyl ether, perfluoroalkylethyl methacrylate, perfluoroalkylethyl acrylate, and a mixture thereof.

A preferred fluorinated reactant in the present invention is fluorinated reactant with telechelic hydroxyl or telechelic alkylamino functional groups on the chain ends, and fluorinated reactant with pendant functional hydroxyl or alkylamino functional groups. A preferred polyfunctional isocyanate in the present invention is selected form the group consisting of monomeric diisocyanate, oligomeric polyisocyanate, polyfunctional isocyanate prepolymer, modified polyisocyanate and a mixture thereof.

It is unexpected that the novel material of fluoroolefin polymer powder-fluorinated polyurethane or fluorinated polyurea can form superhydrophobic surfaces if the novel material is properly roughened.

The present invention discovered that laser etching, plasma etching, abrasive blasting, or sanding with sandpaper can change the fluoroolefin polymer powder-fluorinated polyurethane/polyurea coating into superhydrophobic surfaces. The preferred surface roughening media or sandpaper by grit designation is between 80 grit (177-210 microns) to 320 grit (32.5-36 microns). The preferred roughening means leads to a surface average roughness (RMS) between 12 to 15 microns, preferably in the range of 12.3-14.5 microns.

It is unexpected that novel superhydrophobic surfaces made with powder of fluoroolefin polymer-fluorinated polyurethane/polyurea are mechanically and chemically durable.

The present invention further discovered that a coating material resulting from IPN having PSM structure of fluoroolefin polymer powder, fluorinated and aliphatic polymer segments, and urethane/urea cross-links provide durable superhydrophobic properties if the coating surface is properly roughened.

The present invention further discovered that the novel coating material resulting from IPN having PSM structure of fluoroolefin polymer powder, fluorinated and polysiloxane segments, and urethane/urea cross-links provide durable superhydrophobic properties if the coating surface is properly roughened.

The present invention discovered that a composite having hydrophobic, low freezing point liquid adsorbed into the surface asperities of a superhydrophobic surface results in a durable anti-icing surface.

hydrophobic, low freezing point liquid adsorbed onto surface asperities of superhydrophobic or superhydrophilic surfaces provides renewable anti-icing composite surfaces.

The present invention also discovered that an anti-icing composite resulting from superhydrophobic surfaces having a hydrophobic, low freezing point liquid adsorbed onto its surface asperity spaces can be fabricated over a large area on a rigid or flexible substrate.

In one embodiment, the composite for preventing ice adhesion comprises of a hydrophobic, low freezing point liquid adsorbed onto a superhydrophobic surface of a phase separated, interpenetrating polymer network material.

A method of making composite to prevent ice adhesion comprising the steps: (a) providing a substrate; (b) applying a phase separated interpenetrating polymer network material to the top surface of said substrate; (c) roughening the coated surface to form a superhydrophobic surface by roughening means; and (d) applying a hydrophobic, low freezing point liquid onto said plurality of superhydrophobic surface.

In present invention the preferred substrate is selected from the group consisting of metal, alloy, polymer primed, polymer coated, polymer foam, thermoplastic, elastomer, thermoset elastomer, polyurethane, polyurea, epoxy, polyacrylic, polyamide, polyimide, polycarbonate, polydiene, polyester, polyether, polyfluorocarbon, polyolefin, polystyrene, polyvinyl acetal, polyvinyl chloride, polyvinylidene chloride, polyvinyl ester, polyvinyl ether, polyvinyl ketone, solvent-borne coating, high-solid coating, powder coating, fibre-reinforced polymer composite, thermal sprayed polymer, powder coating, UV coating, casting, vacuum casting, centrifugal casting, molding, injection-molding, reaction injection molding, structural reaction molding, reinforced reaction molding, polymer film coating, and a mixture thereof.

In present invention, wherein said phase separated interpenetrating polymer network material comprises of: (a) at least a polyfunctional reactant; (b) a powder of fluoroolefin polymer, said fluoroolefin is selected from the group consisting of tetrafluoroethylene, hexafluoropropylene, hexafluoroisobutylene, vinylidene fluoride, difluoroethylene, trifluoroethylene, 3,3,3-trifluoropropene, 2,3,3,3-tetrafluoropropene, 1,2,3,3,3-pentafluoropropene, chlorotrifluoroethylene, perfluoroalkyl vinyl ether, hexafluoropropylene oxide, hydropentafluoropropylene, perfluoromethyl vinyl ether, perfluoromethoxyvinyl ether, perfluoropropyl vinyl ether, perfluoroalkylethyl methacrylate, perfluoroalkylethyl acrylate, and a mixture thereof; (c) a polyisocyanate, said polyisocyanate is selected from the group consisting of monomeric diisocyanate, oligomeric polyisocyanate, polyfunctional isocyanate prepolymer, modified polyisocyanate and a mixture thereof; (d) a catalyst, said catalyst is selected from the group consisting of tertiary amine, organometallic complex, and a mixture thereof; and (e) a solvent.

In the present invention, the roughening means leads to a preferred surface roughness RMS (Root Mean Square) between 12 to 15 microns, preferably in the range of 12.3 to 14.5 microns. Said roughening means is selected from the group consisting of laser etching, plasma etching, oxygen plasma etching, abrasive blasting, sanding with sandpaper, and mixture thereof. The preferred abrasive media or sandpaper by grit designation is between 80 grit (177-210 microns) to 320 grit (32.5-36 microns), most preferably 240 grit (50.0-53.4 microns).

In present invention preferred hydrophobic, low freezing point liquid is selected from the group consisting of poly (pentamethylcyclopentasiloxane), polydiethylsiloxane, poly (oxytetrafluoroethylene-co-oxydifluoromethylene), polydimethylsiloxane, poly(dimethylsiloxane-co-diethylsiloxane), poly(ethylmethylsiloxane), poly (methyltrifluoropropylsiloxane), poly (methyltrifluoropropylsiloxane-co-dimethylsiloxane), perfluoropolyether, polyhexafluoropropylene oxide, perfluoropolyalkyl ether, perfluoroalkyl ether substituted s-triazine, fluorinated ether, polychlorotrifluoroethylene, polyalphaolefin hydrogenated, polyalphaolefin, and a mixture thereof.

In one embodiment of this invention, said polyfunctional reactant in said phase separated IPN material is selected from the group consisting of fluorinated telechelic polyol, fluorinated pendant polyol, and a mixture thereof.

The present invention further discovered that the material for superhydrophobic coating resulting from a PSM structured PN having a powder of fluoroolefin polymer, fluorinated and aliphatic polymer segments, and urethane/urea cross-links provides durable superhydrophobic properties if the treated surface is properly roughened.

An other embodiment of this invention, said polyfunctional reactant in said phase separated IPN material comprises of: (a) fluorinated telechelic polyol, fluorinated pendant polyol, and a mixture thereof; (b) at least a polyfunctional aliphatic reactant, said aliphatic reactant is selected from the group consisting of aliphatic polyol, aliphatic polyalkylamine, and a mixture thereof, said aliphatic polyol is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether) glycol, castor polyol, vegetable polyol, and a mixture thereof, said aliphatic polyalkylamine is selected from the group consisting of polyaspartic ester amine, aldimine, polycaprolactone polyalkylamine, polycarbonate polyalkylamine, polyether polyalkylamine, polyester polyalkylamine, polyacrylic polyalkylamine, and a mixture thereof; and (c) at least a chain extender, said chain extender is selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl)ethylenediamine, and a mixture thereof.

The present invention further discovered that material for superhydrophobic coating resulting from a PSM structured IPN having a fluoroolefin polymer powder, fluorinated and aliphatic polymer segments, and urethane/urea cross-links provides durable superhydrophobic properties if the treated surface is properly roughened.

In another embodiment of this invention, said polyfunctional reactant in said phase separated IPN material comprises of: (a) at least a fluorinated polyol, said fluorinated polyol is selected from the group consisting of fluorinated telechelic polyol, fluorinated pendant polyol, and a mixture thereof; and (b) at least a functional siloxane reactant having a plurality of reactive group, said reactive group is selected from the group consisting of amino, carbinol, silanol, hydride, vinyl, isocyanato and a mixture thereof.

The present invention further discloses a superhydrophobic coating material with an IPN having fluoroolefin polymer powder; fluorinated, aliphatic, and polysiloxane segments; and urethane/urea cross-links that provides durable superhydrophobic properties if the coating surface is properly roughened.

In another embodiment of this invention, said polyfunctional reactant in said phase separated IPN material comprises: (a) at least a fluorinated polyol, said fluorinated polyol is selected from the group consisting of fluorinated telechelic polyol, fluorinated pendant polyol, and a mixture thereof; (b) at least a polyfunctional aliphatic reactant, said aliphatic reactant is selected from the group consisting of aliphatic polyol, aliphatic polyalkylamine, and a mixture thereof, said aliphatic polyol is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether) glycol, castor polyol, vegetable polyol, and a mixture thereof, said aliphatic polyalkylamine is selected from the group consisting of polyaspartic ester amine, aldimine, polycaprolactone polyalkylamine, polycarbonate polyalkylamine, polyether polyalkylamine, polyester polyalkylamine, polyacrylic polyalkylamine, and a mixture thereof; (c) at least a chain extender, said chain extender is selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl)ethylenediamine; and (d) at least a functional siloxane reactant having a plurality of reactive group, said reactive group is selected from the group consisting of amino, carbinol, silanol, hydride, vinyl, isocyanato and a mixture thereof.

In the present invention, a thermal treatment may follow to bond the low freezing point liquid onto inter-asperity surfaces by a simple heating mean.

The present invention discovered that a hydrophobic polymer surface changes into a superhydrophilic surface if the surface is properly roughened. The preferred surface roughening media or sandpaper by grit designation is between 80 grit (177-210 microns) to 320 grit (32.5-36 microns). The preferred roughening means leading to a surface average roughness (RMS) between 12 to 15 microns, preferably in the range of 12.3-14.5 microns.

It is unexpected that a hydrophobic, low freezing point liquid adsorbed onto the asperities surfaces of superhydrophilic surface layer results in a durable anti-icing composite.

The present invention discovered a composite for preventing ice adhesion comprising a hydrophobic, low freezing point liquid adsorbed onto a superhydrophilic surface of a hydrophobic polymer.

Wherein said hydrophobic, low freezing point liquid is selected from the group consisting of poly(pentamethylcyclopentasiloxane), polydiethylsiloxane, poly(oxytetrafluoroethylene-co-oxydifluoromethylene), polydimethylsiloxane, poly(dimethylsiloxane-co-diethylsiloxane), poly(ethylmethylsiloxane), poly(methyltrifluoropropylsiloxane), poly (methyltrifluoropropylsiloxane-co-dimethylsiloxane), perfluoropolyether, polyhexafluoropropylene oxide, perfluoropolyalkyl ether, perfluoroalkyl ether substituted s-triazine, fluorinated ether, polychlorotrifluoroethylene, polyalphaolefin hydrogenated, polyalphaolefin, and a mixture thereof.

Wherein said hydrophobic polymer is selected from the group consisting of polyurethane, polyurea, fluorinated polyurethane, fluorinated polyurea, polysiloxane, interpenetrating polymer network material, high density polyethylene, low density polyethylene, polyethylene, polyvinyl chloride, polypropylene, polyethylene terephthalate, polymethylmethacrylate, polycarbonate, acrylonitrile-butadiene-styrene, polyamide, polyimide, polysulfone, polyamide-imide, polyetherimide, polyether ether ketone, polyaryletherketone, cyclic olefin copolymer, ethylene-vinyl acetate, polyoxymethylene, polyacrylate, polyacrylonitrile, polybutadiene, polybutylene, polycaprolactone, polyester, polyvinylidene chloride. polyolefin, polyolefin blend, cycloolefin polymer, poly(ethylene-co-propylene), polybutylene-terephthalate, polyvinyl acetate, polyacryletherrsulphone, liquid crystal polymer, polyurea elastomer, polyurethane elastomer, nature polyisoprene, cis-1,4-polyisoprene, trans-1,4-polyisoprene, synthetic polyisoprene, polybutadiene rubber, chloroprene rubber, Neoprene, poly(isobutylene-co-isoprene), chlorobutyl rubber, nitrile rubber, epoxide rubber, hydrogenated nitrile rubber, ethylene propylene rubber, ethylene propylene diene rubber, epichlorohydrin rubber, polyacrylic rubber, polypentenamer, polyalkenamer, polyoctenamer, polynorbornene, poly(dicyclopetadiene), polycyclorene rubber, butadiene-acrylonitrile rubber, silicone rubber, polyether block amide, chlorosulfonated polyethylene, polysulfide rubber, fluorosilicone rubber, fluoroelastomer, perfluoroelastomer, Tiokol, polypentenomer, alternating rubber, polyether ester, polyolefin blend, elastomeric alloy (TPE-v, TPV), thermoplastic polyurethane, thermoplastic copolyester, thermoplastic polyamide, radiation curing, electron beam curing, oligoethylene, oligopropylene, hydrocarbon resin, oligoether, oligoester, polyvinyl acetal, polyvinyl ketone, polylactic acid, polyisocyanate, and a mixture thereof.

Wherein said superhydrophilic surface results from a roughening means being applied on said hydrophobic polymer leading to a preferred surface roughness (RMS) between 12.3-14.5 microns, and wherein said roughening means is selected from the group consisting of laser etching, plasma etching, oxygen plasma etching, abrasive blasting, sanding with sandpaper, and a mixture thereof.

The present invention relates to a method of making a composite for preventing ice adhesion comprising the steps: (a) providing a substrate having a hydrophobic polymer surface; (b) roughening said surface using a roughening means, resulting in a superhydrophilic surface; (c) applying a hydrophobic, low freezing point liquid onto said superhydrophilic surface.

Present invention discovered that IPN material also can be used as hydrophobic polymer for making composite for preventing ice adhesion.

In the present invention, the interpenetrating polymer network material as hydrophobic polymer comprises of: (a) at least a polyfunctional reactant having a plurality of functional groups; (b) at least a polyfunctional isocyanate selected from the group consisting of monomeric diisocyanate, oligomeric polyisocyanate, polyfunctional isocyanate prepolymer, modified polyisocyanate and a mixture thereof; (c) at least a catalyst, said catalyst is selected from the group consisting of tertiary amine, organometallic complex, and a mixture thereof.

In one embodiment, polyfunctional reactant for interpenetrating polymer network comprises of: (a) at least a polyfunctional aliphatic reactant, said aliphatic reactant is selected from the group consisting of aliphatic polyol, aliphatic polyalkylamine, and a mixture thereof, said aliphatic polyol is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether) glycol, castor polyol, vegetable polyol, and a mixture thereof, said aliphatic polyalkylamine is selected from the group consisting of polyaspartic ester amine, aldimine, polycaprolactone polyalkylamine, polycarbonate polyalkylamine, polyether polyalkylamine, polyester polyalkylamine, polyacrylic polyalkylamine, and a mixture thereof; and (b) at least a chain extender, said chain extender is selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl)ethylenediamine, and a mixture thereof.

In other embodiment, polyfunctional reactant for interpenetrating polymer network material comprises of: (a) at least a fluorinated reactant having a plurality of functional group, said functional group is selected from the group consisting of hydroxyl, alkylamino, and a mixture thereof; (b) at least a polyfunctional aliphatic reactant, said aliphatic reactant is selected from the group consisting of aliphatic polyol, aliphatic polyalkylamine, and a mixture thereof, said aliphatic polyol is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether) glycol, castor polyol, vegetable polyol, and a mixture thereof, said aliphatic polyalkylamine is selected from the group consisting of polyaspartic ester amine, aldimine, polycaprolactone polyalkylamine, polycarbonate polyalkylamine, polyether polyalkylamine, polyester polyalkylamine, polyacrylic polyalkylamine, and a mixture thereof and (c) at least a chain extender, said chain extender is selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl)ethylenediamine, and a mixture thereof.

In an other embodiment, said polyfunctional reactant for interpenetrating polymer network material comprises of: (a) at least a fluorinated reactant having a plurality of functional group, said functional group is selected from the group consisting of hydroxyl, alkylamino, and a mixture thereof; and (b) at least a functional siloxane reactant having a plurality of reactive group, said reactive group is selected from the group consisting of amino, carbinol, silanol, hydride, vinyl, isocyanato and a mixture thereof.

An further embodiment, said polyfunctional reactant in interpenetrating polymer network comprises of: (a) at least a fluorinated reactant having a plurality of functional group, said functional group is selected from the group consisting of hydroxyl, alkylamino, and a mixture thereof; (b) at least a polyfunctional aliphatic reactant, said aliphatic reactant is selected from the group consisting of aliphatic polyol, aliphatic polyalkylamine, and a mixture thereof, said aliphatic polyol is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether) glycol, castor polyol, vegetable polyol, and a mixture thereof, said aliphatic polyalkylamine is selected from the group consisting of polyaspartic ester amine, aldimine, polycaprolactone polyalkylamine, polycarbonate polyalkylamine, polyether polyalkylamine, polyester polyalkylamine, polyacrylic polyalkylamine, and a mixture thereof; and (c) at least a chain extender, said chain extender is selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl)ethylenediamine, and a mixture thereof; and (d) at least a functional siloxane reactant having a plurality of reactive group, said reactive group is selected from the group consisting of amino, carbinol, silanol, hydride, vinyl, isocyanato and a mixture thereof.

The present invention discovered broader selections of materials for superhydrophilic surfaces, and therefore, the material for the composite for preventing ice adhesion. Present invention, substrate having hydrophobic polymer surface is selected from the group consisting of thermoplastic, elastomer, thermoplastic elastomer, thermoset elastomer, polyurethane, polyurea, solvent-borne coating, powder coating, fibre-reinforced polymer composite, powder coating, UV coating, casting, vacuum casting, centrifugal casting, molding, injection-molding, injection-molding sheet, reaction injection molding (RIM), structural reaction molding (SRIM), reinforced reaction molding (RRIM), polymer film coating, and a mixture thereof.

Hydrophobic, Low Freezing Point Liquid

In the present invention, a hydrophobic liquid with a low freezing point is essential for the novel composite for preventing ice adhesion. Such surface is formed by applying a low freezing point liquid onto roughened surfaces of a hydrophobic polymer. To maintain a liquid state under environmental lowest temperatures, it is preferred that the pour point or freezing point of the said hydrophobic liquid for anti-icing surfaces should be lower than −60° C. (213 K). The low freezing point hydrophobic liquid must also be chemical and UV resistant, environmental friendly and have a high flash point.

The liquid with lowest pour points are known: poly (pentamethylcyclopentasiloxane) (122 K), poly(diethylsiloxane) (134 K), poly(oxytetrafluoroethylene-co-oxydifluoromethylene) (140 K), low molecular weight polychlorotrifluoroethylene (144 K), polydimethylsiloxane (146 K), polythiodifluoromethylene (155 K), and polytrifluoropropylsiloxane (203 K).

Many hydrophobic liquids with a low freezing point, low surface energy, high flash point, chemical and UV resistant, and environmental friendly are commercially available, such as: poly(pentamethylcyclopentasiloxane), polydiethylsiloxane, poly(oxytetrafluoroethylene-co-oxydifluoromethylene), polydimethylsiloxane, poly(dimethylsiloxane-co-diethylsiloxane), poly(ethylmethylsiloxane), polythiodifluoromethylene, poly(methyltrifluoropropylsiloxane), poly(methyltrifluoropropylsiloxane-co-dimethylsiloxane), perfluoropolyether, polyisobutene, polyhexafluoropropylene oxide, perfluoropolyalkyl ether, perfluoroalkyl ether substituted s-triazine, fluorinated ether, polychlorotrifluoroethylene, polyalphaolefin (PAO), polyalphaolefin hydrogenated, polybutene.

In the present invention, the preferred low freezing point liquid is selected from the group consisting of poly(pentamethylcyclopentasiloxane), polydiethylsiloxane, poly(oxytetrafluoroethylene-co-oxydifluoromethylene), polydimethylsiloxane, poly(dimethylsiloxane-co-diethylsiloxane), poly(ethylmethylsiloxane), poly(methyltrifluoropropylsiloxane), poly(methyltrifluoropropylsiloxane-co-dimethylsiloxane), perfluoropolyether, polyhexafluoropropylene oxide, perfluoropolyalkyl ether, perfluoroalkyl ether substituted s-triazine, fluorinated ether, polychlorotrifluoroethylene, polyalphaolefin hydrogenated, polyalphaolefin, and a mixture thereof.

In present invention, preferred silicone oil as low freezing point liquids are: polydimethylsiloxanes having a molecular weight between 2,000 to 14,000, a pour point from −65° C. to −60° C., viscosity from 20-350 cSt, and de-volatilized (>90% low molecular weight components removed); polydiethylsiloxanes having a molecular weight from 350-400, 400-500, 500-800, 1300-2000, viscosity from 19 to 300 cSt, and a pour point from −110° C. to −96° C.; and methyl-T-branched polydimethylsiloxanes having a molecular weight of 1650 and pour point of −85° C.

In present invention, polyalphaolefin and polyalphaolefin hydrogenated are selected as low freezing point liquid. Preferred polyalphaolefin or polyalphaolefin hydrogenated is selected from the group consisting of 1-decene dimer, 1-dodecene dimer, 1-decene dimer hydrogenated, 1-dodecene dimer hydrogenated, 1-decene homopolymer, 1-decene homopolymer hydrogenated, 1-dodecene homopolymer, 1-dodecene homopolymer hydrogenated, 1-decene trimer, 1-decene trimer hydrogenated, 1-dodecene trimer, 1-dodecene trimer hydrogenated, poly(1-dodecene-co-1-octene) hydrogenated, and a mixture thereof.

The preferred low molecular weight polychlorotrifluoroethylene (PCTFE) oil are: pour point −71° C. and viscosity 6.3 cSt @ 37.8° C., pour point −73° C. and viscosity 4,2 cSt @ 37.8° C., pour point −93° C. and viscosity 1.8 cSt @ 37.8° C., and pour point −129° C. and viscosity 0.8 cSt @ 37.8° C.

Perfluoropolyethers (PFPE) are a class of low molecular weight fluoropolymers. The basic repeated units are $CF_2O$, $CF_2CF_2O$, $CF_2CF_2CF_2O$, and $CF(CF_3)CF_2O$, while the terminal groups of the polymer chain can be $CF_3O$, $C_2F_5O$, and $C_3F_7O$. Commercially important PFPE products are Krytox®, Demnum®, Fomblin®, and Galden®. The preferred PFPE has a pour point of (−62° C.), an average molecular weight of 1,500, low surface energy (21 dyne/cm), low viscosity (40 cSt), low volatility ($10^{-3}$ mm Hg), and a density higher than water (1.87 g/cm$^3$). PFPE has properties that are ideal for a hydrophobic, low freezing point liquid for the present invention. Surface enrichment of molecules with high fluorine contents is known art. Small amount of addition of high fluorine compounds, such as perfluoropolyether and fluorinated polysiloxane, is utilized for reduce surface energy of low freezing point liquid.

However, PFPE is very expensive. Therefore, it best used for applications for small critical areas or as an additive in low concentrations to low freezing point liquids to reduce surface energy for large area applications. The preferred concentration of PFPE in a low freezing point liquid is between 2.5%−0.05%.

Other options for a hydrophobic, low freezing point liquid include fluorinated polysiloxane, such as poly(methyltrifluoropropylsiloxane) with a molecular weight of 900-1,000, 2,400, pour point from −47° C. to −40° C., density from 1.24-1.25; and poly(methyltrifluoropropylsiloxane-co-dimethylsiloxane) with a molecular weight of 1,800, pour point of −55° C., and density of 1.16. However, since they are expensive, they are best used for small area application or as an additive for reducing the surface energy or adjusting the viscosity of a low freezing point liquid.

A preferred perfluorinated fluid Fluoinert™ is FC 77 having molecular weight 415 and pour point −95° C.

Hydrophobic Polymer

Generally, if water contact angle is small than 90°, the material is considered hydrophilic. If the water contact angle is greater than 90°, the material is considered hydrophobic. Many polymers exhibit hydrophobic surface. In present invention, hydrophobic polymer is selected from the group consisting of polyurethane, polyurea, fluorinated polyurethane, fluorinated polyurea, polysiloxane, interpenetrating polymer network material, high density polyethylene, low density polyethylene, polyethylene, polyvinyl chloride, polypropylene, polyethylene terephthalate, polymethylmethacrylate, polycarbonate, acrylonitrile-butadiene-styrene, polyamide, polyimide, polysulfone, polyamide-imide, polyetherimide, polyether ether ketone, polyaryletherketone, cyclic olefin copolymer, ethylene-vinyl acetate, polyoxymethylene, polyacrylate, polyacrylonitrile, polybutadiene, polybutylene, polycaprolactone, polyester, polyvinylidene chloride. polyolefin, polyolefin blend, cycloolefin polymer, poly(ethylene-co-propylene), polybutylene-terephthalate, polyvinyl acetate, polyacrylethersulphone, liquid crystal polymer, polyurea elastomer, polyurethane elastomer, nature polyisoprene, cis-1,4-polyisoprene, trans-1,4-polyisoprene, synthetic polyisoprene, polybutadiene rubber, chloroprene rubber, Neoprene, poly(isobutylene-co-isoprene), chlorobutyl rubber, nitrile rubber, epoxide rubber, hydrogenated nitrile rubber, ethylene propylene rubber, ethylene propylene diene rubber, epichlorohydrin rubber, polyacrylic rubber, polypentenamer, polyalkenamer, polyoctenamer, polynorbornene, poly(dicyclopetadiene), polycyclorene rubber, butadiene-acrylonitrile rubber, silicone rubber, polyether block amide, chlorosulfonated polyethylene, polysulfide rubber, fluorosilicone rubber, fluoroelastomer, perfluoroelastomer, Tiokol, polypentenomer, alternating rubber, polyether ester, polyolefin blend, elastomeric alloy (TPE-v, TPV), thermoplastic polyurethane, thermoplastic copolyester, thermoplastic polyamide, radiation curing, electron beam curing, oligoethylene, oligopropylene, hydrocarbon resin, oligoether, oligoester, polyvinyl acetal, polyvinyl ketone, polylactic acid, polyisocyanate, and a mixture thereof.

Polyfunctional Reactant—Polyol/Polyamine, Chain Extender

There are hundreds of different isocyanates and thousands of polyols, polyamines, and chain extenders commercially available for formulating polyurethane and polyurea formulation to chose from, resulting in millions of permutations and combinations. Polyols, polyamines, and polyisocyanates with aliphatic, fluorinated, or polysiloxane structures are selected because their UV and weathering resistance.

Aliphatic polyol is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly (tetramethylene ether) glycol, castor polyol, vegetable polyol, and a mixture thereof.

Flexible aliphatic polyols have molecular weights from 2,000 to 10,000, and OH numbers from 18 to 56. Rigid polyols have molecular weights 250 to 700, and OH numbers from 300 to 700. Polyol with molecular weights 700 to 2,000 (OH number 60 to 280) are used to add stiffness or flexibility to base system.

The reaction between the primary amino group and an isocyanato group occurs too quickly under ambient temperature. Instant polyurea coating made with primary polyamine and polyisocyanate facilitated by a with plural component metering spray system results in a very thick coating. Therefore primary amines are is not preferred in the present invention which requires precise control and thin coating. Secondary amities, especially steric hindered or blocked amine compounds have controlled reaction rates toward an isocyanate group and also have low toxicity, low viscosity, and thus are preferred. Especially preferred are the aspartic ester amines, which have controllable reaction rate, low toxicity and low viscosity. The hindered amino-isocyanato reaction can be accelerated by organometallic homogeneous catalysts and tertiary amines under ambient or low temperatures.

Aliphatic polyaspartic ester amines are commercially available and based on 1,2-diaminopropane, 1,4-diaminobutane, 1,6-diaminohexane, 2,5-dimethylhexane, 1,11-diaminoudecane, 1,12-diaminododecane, polypropylene oxide diamine, 4,4'-methylenebis(cyclohexyl amine), 3,3'-dimethyl-4,4'-didiaminocyclohexyl methane, isophorone diamine (1-amino-3-aminomethyl-3,5,5-trimethyl-cyclohaxane), hexamethylene diamine, tetrahydro-2,4-diaminotuluene, tetrahydro-2,6-diaminotuluene, polyoxyalkylene diamine, bis(4-aminocyclohexyl)methane adduct, bis(4-amino, 3-methylcyclohexyl)methane, and 3,4-aminomethyl-1-methylcyclohexylamine.

Aliphatic polyalkylamine, or hindered polyamine is selected from the group consisting of polyaspartic ester amine, aldimine, polycaprolactone polyalkylamine, polycarbonate polyalkylamine, polyether polyalkylamine, polyester polyalkylamine, polyacrylic polyalkylamine, and a mixture thereof.

In the invention chain extender is selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl)ethylenediamine, and a mixture thereof.

Fluorinated polymers, copolymers and telechelics are known in the art [2]. Fluorinated compounds including fluoropolymers with high fluorine content cannot dissolve in common non-fluorinated organic solvents. For fluoropolymer to be soluble in common solvents, it must contain hydrocarbon oleophilic spacers in the main chain or in pendent groups.

Accordingly, in the present invention, a functional fluorinated reactant is selected from fluorinated compounds having a functional group selected from hydroxyl, alkylamino, or isocyanato.

Telechelic Functional (Hydroxyl, Hindered Amino, Alkylamino, Isocyanato) Fluorinated Reactant Short fluorotelechelic diols, such as $HOCH_2(CF_2)_nCH_2OH$ with n=2, 4, 6, 8, 10, functional PFPO high molecular perfluorinated polyether (PFPE) telechelic diols, fluorinated polyol resins derived from hexafluoroacetone (HFA), such as a mixture of 1,3-bis(3-hydroxyhaxafluoro-2-propyl)benzene, and 1,4-bis(3-hydroxyhaxafluoro-2-propyl)benzene are commercially available. Fluorotelechelic compounds having hydrocarbon segments in the main chain or in pendant groups are soluble in common solvents.

Many fluorotelechelic diols, diamines, dialkylamines, diisocyanates having 2-perfluoroalkylethyl methacylate, 2-perfluoroalkylethyl acrylate, perfluoroalkylmethyl methacrylate, perfluoroalkylmethyl acrylate, hexafluoropropylmethyl methacrylate, and hexafluoropropylmethyl acrylate segments can be prepared by controlled/living polymerization (C/LRP). This technique offers polymers of controlled composition, architecture, very narrow polydispersity, and high purity. The most promising C/LRP methods used for fluorinated polymers are Atom Transfer Radical Polymerization (ATRP), and Iodine Transfer Polymerization (ITP). The two step synthesis prepares telechelic polyperfluoroalkylethyl methacrylate diol. Other fluorotelechelic functional diamines, dialkylamines, or diisocyanate also can be synthesized with suitable initiators followed by post modification.

According to the preferred embodiment of the invention, fluorotelechelic diols, diamines, dialkylamines, and diisocyanates, obtained by cationic ring-opening polymerization of cyclic ethers having fluoroalkyl terminal groups are preferred. Cyclic ethers including fluoroalkyl oxetane and fluoroalkyl tetrahydrofuran, such as 2-(1,1,2,3,3,3-hexafluoropropyl) tetrahydrofuran, are polymerized by cationic ring-opening C/LRP which provides telechelic hydroxyl functional groups. Cationic ring-opening polymerization can be initiated by anhydrides of super acids such as trifluoromethane sulfonic acid or fluorosulfonic acids. End-capping reaction by nucleophile reagent produces telechelic functional polymers. End-capping by potassium cyanate produces a isocyanate group, end-capping by ammonia produces a primary diamine group, end-capping by alkyl amine produces a secondary amine group, and sodium hydroxide end-capping produces a hydroxyl group.

Ring opening polymerizations of lactone and lactide cyclic esters with fluoroalkyl groups are preferred. Ring opening polymerization of cyclic esters can be performed by cationic, anionic, or pseudo anionic-coordination insertion mechanisms. A large variety of organometallic compounds have been developed as initiators or catalysts for coordination-insertion living polymerization. Initiators that prevent transesterification, back-biting, macrocycle, and racemization are lanthanide alkoxides, aluminum tri-isopropoxide, Ti(II) alkoxides, and Ti(II) 2-ethylhexanoate. ABA tri-block elastomeric copolymers with well defined architecture can also be synthesized. Hydroxyl, alkylamino, isocyanato functional groups of telechelic polyester are introduced either by functional initiation or end-capping of living polymers, or by a combination of the two methods.

Pendant Functional (Hydroxyl, Isocyanato) Fluorinated Reactant

In present invention, fluorinated polyols with pendant hydroxyl functional groups are preferred. Fluorinated Ethylene Vinyl Ether (FEVE) polyol based on copolymerization of fluoroolefin with vinyl ether, such as chlorotrifluoroethylene (CTFE) with cyclohexyl vinyl ether is commercially available. Other FEVE polyol, copolymer of fluorinated ethylene with vinyl monomer can be synthesized readily by radical polymerization or C/LRP.

Isocyanato polyfunctional fluorinated prepolymer is not commercially available. The present invention provides a synthesis method for isocyanato polyfunctional fluorinated prepolymer based on FEVE fluorinated polyols with excess diisocyanate reactants. According to the preferred embodiment of the invention, fluorinated polyol is synthesized by copolymerization monomers comprising of: (a) a fluorinated monomer being a fluoroolefin, (b) an oleophilic monomer being an aliphatic or cycloaliphatic oxygen-containing functional unsaturated monomer, and (c) a hydroxyl-containing oleophilic monomer being an unsaturated derivative of a vinyl group-containing functional monomer.

Synthesis of Functional Fluorinated Pendant Polyol

The process for preparing fluorinated polyol carried out by polymerization is known in the art [2]. The half-life temperature of the selected radical initiator determines the polymerization temperature. Polymerization temperature can be selected from the range of 20° C. to 180° C., preferably between 40° C. to 120° C. The reaction pressure can range from 1 to 80 bars.

Copolymerization of unsaturated monomers containing a fluorinated monomer is commonly initiated by a radical initiator of organic peroxide, inorganic peroxide, azo compound, or an organic redox system.

Azo compounds are common radical initiators, such as dialkyldiazenes, 2,2'-azobis (methylbutyronitrile), 1,1'-azobis (cyclohexanecarbonitrile), 2,2'-azobis (isobutyronitrile), 2,2'-azobis (2-methylpropionitrile), 4,4'-azobiz(4-cyanovaleric acid), 2,2'-azobis(2,4-dimethyl valeronitrile). They are also suitable to initiate control/living polymerization when combined with a reversible deactivation agent.

Among the various radical initiators, organic peroxides are the most popular. Commercially available organic peroxide compounds are selected from the group consisting of tert-amyl peroxide, diacyl peroxide, dialkyl peroxide, dialkylperoxydicarbonate, peroxyester, ketone peroxide, peroxydicarbonate, hydroperoxide, peroxyketal, and a mixture thereof.

Tert-amyl peroxide radical initiators provide the fluorocopolymer with chain linearity and narrow molecular weight distributions. They include: t-amyl peroxy-neodecanoate, t-amyl peroxy-neoheptaneoate, t-amyl peroxy-pivalate, t-amyl peroxy-2-ethylhaxanoate, t-amyl peroxy benzoate, t-amyl peroxy acetate, 1,1-di(t-amylperoxy) cyclohexane, 2,2-di(t-amylperoxy)propane, ethyl 3,3-di(t-amylperoxy) butyrate, di-t-amyl peroxide, and O,O-t-amyl O-(2-ethylhexyl) monoperoxy carbonate.

The preferred chemical structure of the present invention is a fluorinated copolymer with an alternating fluorinated and non-fluorinated sequence. It has superior structure stability with better chemical, oxidation, UV, and thermal resistance than a copolymer with random sequence structures.

The copolymerization of an electron deficient oleophobic fluoroolefin unsaturated monomer with an electron-rich oleophilic, oxygen-containing functional non-fluorinated monomer forms a copolymer with an alternating structure.

In the present invention, the electron deficient oleophobic monomer being a fluoroolefin is selected from the group consisting of tetrafluoroethylene (TFE), hexafluoropropylene (HFP), hexafluoroisobutylene (HFIB), vinylidene fluoride (VDF), difluoroethylene (DFE), trifluoroethylene (TFE), 3,3,3-trifluoropropene (TFP), 2,3,3,3-tetrafluoropropene, 1,2,3,3,3-pentafluoropropene, chlorotrifluoro ethylene (CTFE), perfluoroalkyl vinyl ether (PAVE), hexafluoropropylene oxide, hydropentafluoropropylene, perfluoromethyl vinyl ether, perfluoromethoxyvinyl ether, perfluoropropyl vinyl ether, perfluoroalkylethyl methacrylate, perfluoroalkylethyl acrylate, and a mixture thereof.

In the present invention, the electron-rich oleophilic monomer being a vinyl monomer of an aliphatic or cycloaliphatic oxygen-containing functional monomer is selected from the group consisting of:
(a) vinyl ether selected from the group consisting of isobutyl vinyl ether, tert-butyl vinyl ether, cyclohexyl vinyl ether, dodecyl vinyl ether, octadecyl vinyl ether, tert-amyl vinyl ether, 2-ethyl hexyl vinyl ether, adamantyl vinyl ether, norbonyl vinyl ether, dihydrofurane, dihydropyran, and a mixture thereof;
(b) vinyl ester selected from the group consisting of vinyl cyclohexanecarboxylic acid ester, vinyl neodecanoate, vinyl isobutyrate, vinyl tert-butyrate, vinyl isovalerate, vinyl 3-methyl butyrate, vinyl versatate, vinyl isobutyrate, vinyl pivalate, vinyl caproate, vinyl 2-methyl pentanoate, perfluoroalkylethyl vinyl ether, and a mixture thereof;
(c) acrylate selected from the group consisting of iso-butyl acrylate, tert-butyl acrylate, amyl acrylate, tert-amyl acrylate, 2-ethylhexyl acrylate, lauryl acrylate, cyclohexyl acrylate, stearyl acrylate, iso-butyl methacrylate, tert-butyl methacrylate, amyl methacrylate, tert-amyl methacrylate, 2-ethylhexyl methacrylate, lauryl methacrylate, cyclohexyl methacrylate, hexafluorobutyl acrylate, hexafluorobutyl methacrylate, dodecafluoroheptyl acrylate, dodecafluoroheptyl methacrylate, perfluoroalkylethyl methacrylate, perfluoroalkylethyl acrylate, stearyl methacrylate, and a mixture thereof;
(d) vinyl carbonate such as 1,3 vinyl-dioxolan-2-one
(e) functional cyclic monomer selected from the group consisting of dihydrofuran, 3,4-dihydro-2H-pyran, oxanorburnene, tetrahydrofuran, oxetane, and a mixture thereof.

The present invention the introduce of hydroxyl group into the polymer chain utilizes an electron-rich oleophilic, hydroxyl-containing functional monomer being a hydroxyl vinyl monomer selected from the group consisting of hydroxybutyl vinyl ether, 4-(hydroxymethyl)cyclohexyl methyl vinyl ether, hydroxybutyl acrylate, hydroxymethylcyclohexyl acrylate, hydroxybutyl methacrylate, hydroxybutyric acid vinyl ester, hydroxydecanoic acid vinyl ester, hydroxydodecanoic acid vinyl ester, hydroxyhaxadecanoic acid vinyl ester, hydroxyhexanoic acid vinyl ester, and a mixture thereof.

In the present invention, the reaction medium for copolymerization is selected from an organic solvent, carbon dioxide, or a mixture of solvent with carbon dioxide. A water-free, urethane grade solvent medium is preferred.

Chain transfer agents provide molecular weight control and a colorless final product. $C_3$-$C_5$ saturated hydrocarbon in a concentration of 1-0.05% of the total monomer is the preferred chain transfer agent.

Functional Fluorinated Polyol with High Fluorine Content

A functional fluorinated polyol with high fluorine content provides higher UV and chemical durability.

In a preferred embodiment of the present invention, a convenient technique to increase fluorine content is based on the starved feed of an electron-rich vinyl monomer. Pendant fluorinated polyol with high fluorine content is synthesized by copolymerization of monomers comprising of (a) a fluorinated monomer, and starved feed of (b) unsaturated oxygen-containing aliphatic or cycloaliphatic monomers, and (c) hydroxyl functional units being hydroxyl functional unsaturated monomers. The mole ratio of fluorinated to non-fluorinated monomers in the hydroxyl functional fluorinated polymer with high fluorine content is greater than 1:1.

For synthesis of a linear hydroxyl polyfunctional fluorinated polyol with high fluorine content, a electron-deficient, fluorinated monomer is selected from the group consisting of tetrafluoroethylene, hexafluoropropylene, hexafluoroisobutylene, vinylidene fluoride, difluoroethylene, trifluoroethylene, 3,3,3-trifluoropropene, 2,3,3,3-tetrafluoropropene, 1,2,3,3,3-pentafluoropropene, hydropentafluoropropylene, fluoroalkyl vinyl ether, perfluoromethoxyvinyl ether, perfluoromethyl vinyl ether, perfluoropropyl vinyl ether, fluorinated methacrylate, fluorinated acrylate, fluorinated styrene, fluorinated tetrahydrofuran, fluorinated oxetane, and a mixture thereof.

In the present invention, for the synthesis of a hydroxyl functional fluorinated polyol with high fluorine content, the selection of oleophilic, electron-rich, vinyl monomers and hydroxyl functional vinyl monomers are same as for the alternative hydroxyl functional fluorinated polyol.

Functional Siloxane Reactant—for Siloxane Segment

One objective of this invention is to provide a siloxane segment for the novel IPN material comprising of a functional siloxane reactant having a plurality of reactive groups selected from the group consisting of aminoalkyl, carbinol, silanol, hydride, vinyl, isocyanato and a mixture thereof.

Hydride Siloxane—Functional Siloxane Reactant

Hydride functional groups of siloxanes will undergo a catalytic dehydrogenetic coupling reaction with silanol functional siloxanes to form siloxane chains in the presence of organometallic catalysts. Hydride functional siloxane undergoes catalytic addition with vinyl functional siloxane when catalyzed by a platinum complex. Organometallics accelerate catalytic reactions of dehydrogenative reactions and dehydrogenative crosslink reactions of hydride siloxane and release hydrogen.

One embodiment of the present invention utilizes catalytic dehydrogenative coupling between hydride siloxane and silanol siloxane or hydride siloxane with hydrolyzed silane to release hydrogen and form a crosslinked siloxane network. This invention discovered that the hydrogen released from dehydrogenative catalytic reactions of reactive hydride produces foam, which results in the formation of Interconnected Micro Channels (IMC) with nano/micron Interface Phase Segregation/Separation (IPS) on surfaces with the novel Interpenetrating Polymer Network (IPN) material having fluorinated and siloxane segments and urethane/urea cross-links. The nano/micron IPS structures of IMC with IPN facilitate the fabrication of anti-icing composite with superhydrophobic and low freezing point liquid adsorbed on asperity surfaces.

The preferred hydride siloxanes for the present invention are as follows: poly(methylhydrosiloxane) having a molecular weight of 950-1,200 or 1,700-3,200, hydride terminated polymethylsiloxane having a molecular weight from 1,000 to 28,000 and equivalent weight of 500-14,000; trimethylsiloxy terminated copolymer of methylhydrosiloxane-dimethylsiloxane having a molecular weight of 1,200 to 65,000 and equivalent weight of 135 to 1,240; hydride terminated copolymer of methylhydrosiloxane-dimethylsiloxane having a molecular weight of 2,000 to 2,600 and equivalent weight 200; trimethylsiloxy terminated polymethylhydrosiloxane having a molecular weight of 1,400-2,400 and equivalent weight of 67-64.

Silanol Siloxane—Functional Siloxane Reactant

Silanol functional siloxane undergoes dehydrogenetic coupling with hydride functional siloxane. Organometallic complexes, such as organotin, organozinc, and organoirin catalyze dehydrogenetic coupling. In the present invention, silanol functional siloxanes are preferred as the reactive siloxanes with hydride siloxane. The hydrogen released by dehydrogenetic coupling provides a foamed structure.

In one preferred embodiment of the present invention, equal molar masses of hydride siloxane and silanol siloxane are selected as polyfunctional siloxane reactants in a catalytic reaction composition. In the present invention, the preferred silanol siloxanes are as follows: silanol terminated polymethylsiloxane having a molecular weight from 700-1500 to 49,000, 3-4% to 0.007% OH, and OH equivalent weight 1.7-2.3 to 0.039-0.043 OH eq/kg; silanol terminated polyphenylmethylsilane having a molecular weight from 900 to 50,000, and 4.8-0.4% OH; Silanol terminated polydiphenylsiloxane having a molecular weight of 1000-1,400 and 3.4-2.4% OH; and silanol terminated polytrifluoropropylmethylsiloxane having a molecular weight of 550-1,200, 7-3% of OH.

Carbinol Terminated Siloxane—Functional Siloxane Reactant

The term carbinol refers to the hydroxyl group bonds to carbon (C—OH) to differentiate them from hydroxyl group bonds to silicon (Si—OH). The carbinol group in hydroxyalkyl siloxane reacts with an isocyanato group to form a urethane link. In the present invention, carbinol functional siloxanes are the preferred polyfunctional siloxane reactants to provide phase segregated siloxane segments and urethane crosslinked networks. A carbinol functional siloxane can be selected from linear terminated carbinol siloxane and pendant carbinol siloxane.

The preferred carbinol siloxanes for the present invention are as follows: hydroxypropyl terminated polydimethylsiloxanes having a molecular weight of 1000, 2000, 3000, 4000, 5000, or 8000; hydroxyethyoxypropyl terminated polydimethylsiloxane having a molecular weight of 2000, 4000, 5000 or 8000; hydroxyhexyl terminated polydimethylsiloxane having a molecular weight of 2000, 4000, 5000, or 8000; hydroxybutyl terminated polydimethylsiloxane having a molecular weight of 2000, 3000, 4000, 5000, or 8000; hydroxypentyl terminated polydimethylsiloxane having a molecular weight of 2000, 3000, 4000, 5000 or 8000; and hydroxyhexyl terminated polydimethylsiloxane having a molecular weight of 2000, 3000, 4000, 5000 or 8000.

Aminoalkyl Terminated Siloxane—Functional Siloxane Reactant

The amino group in aminoalkyl siloxane reacts with an isocyanato group to form a urea link. In the present invention, aminoalkyl functional siloxanes are the preferred polyfunctional siloxane reactant for providing a phase segregated siloxane segment and urea crosslinked network. The aminoalkyl functional siloxane is selected from a linear terminated aminoalkyl siloxane.

The preferred aminoalkyl siloxanes for present invention are as follows: aminopropyl terminated polydimethylsiloxanes having a molecular weight of 900-1000, 2000, 3000, 4000, 5000, and $NH_2$: 3.0-3.2%, 2.0-2.2%, 1.0-1.2%, 0.8-0.9%, 0.6-0.7%; aminohexyl terminated polydimethylsiloxane having a molecular weight of 2000, 3000, 4000, 5000, 8000, or 10,000; ethylpiperazine terminated polydimethylsiloxane having a molecular weight of 2000, 3000, 4000, 5000, 8000 or 10,000; alpha, omega-di[(N-ethyl)amino(2-methyl)propyl] polydimethylsiloxane having a molecular weight of 2000, 3000, 4000, 5000, 8000 or 10,000; and alpha, omega-di[(N-methyl)amino(2-methyl)propyl]polydimethylsiloxane having molecular weight of 2000, 3000, 4000, 5000, 8000 or 10,000.

Polyaspartic Ester Amine Terminated Siloxane—Functional Siloxane Reactant

In a preferred embodiment of the present invention, the secondary amine of the siloxane reactant—polyaspartic ester amine terminated siloxane—is selected as the reactive polyfunctional siloxane polymer. The secondary amine group in silicone polyaspartic ester amine reacts with an isocyanato group to form a urea crosslink at a controlled rate by organo-metallic homogeneous catalysts under ambient or low temperatures.

The present invention provides a synthesis method for polyaspartic ester amine terminated siloxane through a reaction of aminoalkyl terminal siloxane polymer/oligomer or pendent aminoalkyl polysiloxane with excess dialkyl fumarates or dialkyl maleates via Michael addition. Suitable dialkyl maleates include but are not limited to diethyl maleate, dipropyl maleate, dibutyl maleate, methyl propyl maleate, and ethyl propyl maleate. Suitable dialkyl fumarates include diethyl fumarate, dipropyl fumarate, dibutyl fumarate, methyl propyl fumarate, and ethyl propyl fumarate. Suitable diamines are selected from aminoalkyl terminated polysiloxanes including 1,3-bis(3-aminoalkylpropyl), tetramethyldisiloxane, alpha, omega-bis(aminopropyl) polysiloxane, and alpha, omega-(3-aminopropyl) polydimethylsiloxane.

Polyfunctional Isocyanate—Crosslink Reactant

Since most anti-icing coatings are used outdoors, they must have UV and weathering resistance. Therefore, aliphatic polyfunctional isocyanates are required in the present invention. A suitable aliphatic polyfunctional isocyanate is selected from the group consisting of (1) a monomeric diisocyanate selected from 1,6-diisocyanato hexamethylene (HDI), isophorone diisocyanate (IPDI, 1-isocyanato-3-isocyanatomethyl-3,5,5-trimethyl-cyclohexane), 1,4-cyclohexylene diisocyanate, 1,4-tetramethylene diisocyanate, 1,5-pentamethylene diisocyanate, 1,7-heptamethylene diisocyanate, 2,2,4- and 2,4,4-trimethylhexamethylene diisocyanate, 2,2,4-trimethyl-1,6-hexamethylylene diisocyanate (TMDI), 1,3-bis-(isocyanatomethyl)cycloxane ($H_6XDI$), 1,10-decamethylene diisocyanate, 4,4'-diisocyanato dicyclohexylmethane ($H_{12}MDI$, or HMDI), norbornane diisocyanate (NDI), and a mixture thereof; (2) an oligomeric polyisocyanate selected from aliphatic polyisocyanates based on hexamethylene diisocyanate, hexamethylene diisocyanate biuret, hexamethylene diisocyanate trimer, aliphatic polyisocyanates based on isophorone diisocyanate, aliphatic polyisocyanates based on 4,4'-diisocyanato dicyclohexylmethane, and mixture thereof; (3) a polyfunctional isocyanate prepolymer selected from aliphatic polyfunctional isocyanate prepolymer based on isocyanato terminated polyether prepolymer, polyfunctional isocyanato terminated polyester prepolymer, polyfunctional isocyanato terminated polycarbonate prepolymer, polyfunctional isocyanato terminated polycaprolactone prepolymer, polyfunctional isocyanato fluorinated prepolymer; polyfunctional isocyanato polysiloxane prepolymer and mixture thereof; (4) a modified polyisocyanate selected from carbodiimide, urededione, and a mixture thereof.

Aliphatic polyisocyanate resins and isocyanate prepolymers based on hexamethylene diisocyanate (HDI), HDI biuret, HDI trimer, isophorone diisocyanate (IPDI), 4,4'-diisocyanato dicyclohexylmethane ($H_{12}MDI$, or HMDI) offer environmental friendliness, ease of handling, fast curing, and a longer shelf life. Many commercially available products of aliphatic polyisocyanates are based on HDI, IPDI, and HMDI aliphatic polyfunctional isocyanate prepolymers, such as polyfunctional isocyanato terminated polyether prepolymer, polyfunctional isocyanato terminated polyester prepolymer, polyfunctional isocyanato terminated polycarbonate prepolymer, and polyfunctional isocyanato terminated polycaprolactone prepolymer. Aliphatic isocyanate, polyisocyanate and isocyanato terminated prepolymers are useful in present invention.

Isocyanato Functional Fluorinated Prepolymer—Crosslink Reactant

Isocyanato polyfunctional fluorinated prepolymers in various viscosities are useful for providing anti-icing properties.

The present invention provides a synthesis method for a polyfunctional fluorinated isocyanato prepolymer. This method is based on the reaction of polyfunctional fluorinated polyol with excess diisocyanate to form an isocyanato terminated intermediate, i.e. a prepolymer. The diisocyanate selected is from isophorone diisocyanate (IPDI), 4,4'-diisocyanato dicyclohexylmethane (HMDI), 1,6-diisicyanato hexamethylene (HDI), and a mixture thereof.

Polyfunctional Isocyanato Siloxane Prepolymer—Crosslink Reactant

Polyfunctional isocyanato polysiloxane prepolymers in various viscosities are useful for providing excellent anti-icing properties.

The present invention provides a synthesis method for a polyfunctional polysiloxane isocyanato prepolymer based on the reaction between polyfunctional carbinol polysiloxane with excess diisocyanate to form a isocyanato terminated intermediate, i.e. a prepolymer. The diisocyanate is selected from isophorone diisocyanate (IPDI), 4,4'-diisocyanato dicyclohexylmethane (HMDI), 1,6-diisicyanato hexamethylene (HDI), and a mixture thereof.

One embodiment of the present invention provides a synthesis method for a polyfunctional polysiloxane isocyanato prepolymer based on the reaction between polyfunctional aminoalkyl polysiloxane with excess diisocyanate to form an isocyanato terminated intermediate, i.e. a prepolymer. The diisocyanate is selected from isophorone diisocyanate (IPDI), 4,4'-diisocyanato dicyclohexylmethane (HMDI), 1,6-diisicyanato hexamethylene (HDI), and a mixture thereof.

Catalyst

Crosslink reactions between isocyanato groups with hydroxyl groups or second amine groups are catalyzed by tertiary amine catalysts and organometallic complexes. Triethylenediamine (TEDA),1,4-diazabicyclo[2,2,2]octane (DABCO), dimethylcyclohexylamine (DMCHA), dimethylethanolamine (DMEA), tetramethylbutanediamine (TMBDA), pentamethyldipropylenetriamene, N-(3-dimethylaminopropyl)-N,N-diisopropanolamine, 1,3,5-(tris(3-dimethylamino)propyl)-hexahydro-s-triazine, bis-(2-dimethylaminoethyl)ether (A-99), N-ethylmorpholine, 1,8-diazabicyclo[5,4,0]undecane-7 (DBU), pentamethyldiethylenetriamine (PMDETA), benzyldimethylamine (BDMA). The newest is N,N,N'-trimethyl-N'-hydroxyethyl-bis(aminoethyl)ether or N'-(3-(dimethylamino)propyl-N,N-dimethyl-1,3-propanediamine that reacts into the polymer matrix for eliminating volatile catalyst.

Noble metal complexes are the most active but most expensive, such as platinum, rhodium and ruthenium complexes. Organomercury and organolead compounds have a very high and selective catalytic activity. However, they are not recommended since they are high neurotoxin and are dangerous pollutants.

Preferred catalysts maximize shelf life and minimize drying time. Tin complexes are the most popular, such as tin carboxylate, tin octoate, tin II neodecanoate, tin II octoate, tin II oleate, dibutyltin diacetate, dibutyltin dilaurate, dibutyltin diisooctylmaleate, dimethyltin dineodecanoate, dioctyltin dilaurate, bis(2-ethylhexanoate)tin, stannous octoate, bis(2-ethylhexanoate)tin, bis(neodecanoate)tin, di-n-butyl bis(2-ethylhexylmaleate)tin, di-n-butyl bis(2,4-petanedionate)tin, di-n-butylbutoxychlorotin, di-n-butyldiacetoxytin, di-n-butyldilauryltin, di-n-butyldilauryltin, dimethyldineodecanoatetin, dimethylhydroxy(oleate)tin, dioctyldilauryltin, and dibutyltin dilaurate combined with 1,4-diazabicyclo[2,2,2] octane (DABCO).

Bismuth carboxylate, iron octoate, zinc octoate, aminecuprous chloride complex, aluminum chelate such as aluminum dionate, zirconium chelate such as zirconium dionate, zirconium tetrakis(2,4-pentanedionate) complex, and aluminum tris(2,4-pentanedionate) complex, are also effective.

Titanates are also active, such as titanium di-n-butoxide (bis-2,4-pentanedionate), titanium diisopropoxide (bis-2,4- pentanedionate), titanium diisopropoxide bis(ethylacetoacetate), and titanium 2-ethylhexoxide.

Organometallics accelerate catalytic reactions of functional siloxanes, such as dehydrogenative crosslink reactions of hydride siloxane and release hydrogen. Reactions of functional siloxanes are accelerated by titanates and tin complexes, such as titanium di-n-butoxide, titanium (bis-2,4-pentanedionate), titanium diisopropoxide, titanium (bis-2,4-pentanedionate), titanium diisopropoxide, titanium bis(ethylacetoacetate), titanium 2-ethylhexoxide, titanium trimethylsiloxide, bis(2-ethylhexanoate)tin, bis(neodecanoate)tin, di-n-butyl bis(2-ethylhexylmaleate)tin, di-n-butyl bis(2,4-petanedionate)tin, di-n-butylbutoxychlorotin, di-n-butyldiacetoxytin, di-n-butyldilauryltin, di-n-butyldilauryltin, dimethyldineodecanoatetin, dimethylhydroxy(oleate) tin, dioctyldilaurtltin, tin carboxylate, tin octoate, dibutyltin diacetate, dibutyltin dilaurate, dibutyltin diisooctylmaleate, dimethyltin dineodecanoate, dioctyltin dilaurate, bis(2-ethylhexanoate)tin, stannous octoate, bismuth carboxylate, aluminum chelate, zirconium chelate, silver nitrate, silver, nitrite, zinc octoate, iron octoate, zirconium dionate, amine-cuprous chloride complex, and tetrachlorocuprate.

Fluoroolefin Polymer Powders—Plurality of Particles

In a preferred embodiment of the invention, fluoroolefin polymer powders (the plurality of particles) provide Phase Separation/Segregation Morphology structure of IPN that is necessary factor for superhydrophobic surfaces. Fluoroolefin polymer powders are synthesized by homopolymerization or copolymerization of fluorinated olefin monomers or mixed monomers [2]. The preferred fluoroolefin monomer is selected from the group consisting of tetrafluoroethylene (TFE), hexafluoropropylene (HFP), perfluoroalkyl vinyl ether (PAVE), perfluoromethoxyvinyl ether, perfluorinated methacrylate, perfluorinated acrylate, 2,2-bistrifluoromethyl-4,5-difluoro-1,3-dioxole, perfluorinated styrene, perfluorinated tetrahydrofuran, perfluorinated oxetane, hexafluoroisobutylene, vinylidene difluoride, difluoroethylene, trifluoro ethylene, 3,3,3-trifluoropropene, 2,3,3,3-tetrafluoropropene, 1,2,3,3,3-pentafluoropropene, chlorotrifluoroethylene, hexafluoropropylene oxide, hydropentafluoropropylene, and a mixture thereof. The most important commercial fluoropolymers are polytetrafluoroethylene (PTFE), perfluorinated ethylene propylene copolymer (FEP), TFE-PDD (2,2-bistrifluoromethyl-4,5-difluoro-1,3-dioxole) copolymer (AF), polyperfluoroacrylate, poly(vinylidene fluoride) (PVDF), and polychlorotrifluoroethylene.

Perfluorinated polymer powders are obtained by homopolymerization or by copolymerization in an aqueous emulsion or in an aqueous suspension [2]. The commercially available fluoropolymer with high fluorine contents have a specific size distribution of micron particles agglomerated by nanoparticles. Depending on polymerization conditions and the processes that follow polymerization, the nano/micron particle size, weight percentage, and agglomerate size distribution will greatly vary. For example, DuPont provides PTFE powders under the Zonyl® trade name. MP 1000 has an average agglomerate size of 8-15 microns with a broad particle size distribution. MP 1100 has an average agglomerate size of 1.8-4 microns and a narrow particle size distribution. MP 1600 has a low molecular weight and is loosely agglomerated with an average agglomerate size of 4-12 microns. The final particle size of all MP series agglomerated powders can be reduced to about 200 nanometers.

The final particle size distribution is dependent on de-agglomerate methods. High shear energy breaks down agglomerated particles into primary nanoparticles with high efficiency. Preferred de-agglomeration methods include but are not limited to, wet mills (including ball, stirred media, centrifugal and jet mills), high pressure homogenizer, ultrasound sonicating bath, ultrasound probe sonicating, and ultrasonic disruptor. In the present invention, the preferred de-agglomerate step should be conducted in a solvent or polyfunctional fluorinated reactant-solvent media.

Solvent

In the present invention, organic urethane grade solvents or a mixture of solvents are used. EPA VOC-exempted solvents are preferred, such as acetone, methyl acetate, tert-butyl acetate, methylene chloride, methyl chloroform, parachlorobenzotrifluoride, and cyclic, branched, or linear completely methylated siloxanes. The preferred solvents also include acetonitrile, acetophenone, amyl acetate, benzyl benzoate, bis(2-ethylhexyl) adipate, bis(2-ethylhexyl) phthalate, butanone, n-butyl acetate, sec-butyl acetate, n-butyl propionate, gama-butylolactone, chloroform, cyclohexanone, cyclopentanone, dichloromethane, diethyl carbonate, diethyl ketone, diisobutyl ketone, dimethyl carbonate, N,N-dimethylacetamide, N,N-dimethylformamide, dimethyl sulfoxide dioctyl terephthalate, 1,4-dioxane, ethyl acetate, 2-ethoxyethyl ether, ethyl acetoacetate, ethyl butyrate, ethyl lactate, ethylene carbonate, cyclobutanone, ethyl isopropyl ketone, hexyl acetate, isoamyl acetate, isobutyl acetate, isobutyl isobutyrate, isopropyl acetate, isophorone, mesityl oxide, methyl acetate, methyl amyl acetate, methyl butyl ketone, methyl ethyl ketone, methyl isoamyl ketone, methyl isobutyl ketone, methyl isopropyl ketone, methyl phenylacetate, methyl propyl ketone, 1-methyl-2-pyrrolidinone, octyl acetate, parachlorobenzotrifluoride, perchloroethylene, 3-pentanone, n-pentyl propionate, propyl acetate, beta-propyolactone, tetrahydrofuran, toluene, triacetin, delta-valerolactone, xylene, and cyclic, branched, or linear completely methylated siloxanes. The anhydrous organic solvents listed above can be used as a polymerization medium or as the solvent for coatings material for preparing novel composite for prevent ice adhesion.

$CO_2$, a mixture of $CO_2$ with anhydrous organic solvent or a mixture of organic solvents are the preferred polymerization mediums.

Reactive Diluent

In the present invention, reactive diluents with low molecular weight can be used to reduce volatile organic compounds (VOC) in polyurethane or polyurea formulations. They are used for reduce system viscosity, and reactivity toward polyisocyanates. Commercial available reactive diluents are polyester or polyether polyols, castor oil derivative, oxazolidines, and acetoacetates. The drawbacks of use reactive diluents are the high costs and performance change by low molecular weigh and low functionality.

Substrate

In the present invention, the composite for preventing ice adhesion can be applied on any solid surface. Unlimited solid materials can be used as a substrate. It includes metals, alloys, ceramic, glass, thermoplastic, elastomer, thermoplastic elastomer, fibre-reinforced polymer composite, injection molding, casting, vacuum casting, centrifugal casting, reaction injection molding (RIM), structural reaction molding (SRIM), and reinforced reaction molding (RRIM).

A preferred thermoplastic as substrate material is selected from the group consisting of high density polyethylene (HDPE), low density polyethylene (LDPE), polyethylene (PE), polyvinyl chloride (PVC), polypropylene (PP), polyethylene terephthalate (PET), polymethylmethacrylate (PMMA), polycarbonate (PC), acrylonitrile-butadiene-styrene (ABS), polyamide (Nylon 6), polyimide (PI), polysulfone (PSF), polyamide-imide (PAI), polyetherimide (PEI), polyether ether ketone (PEEK), polyaryletherketone (PEAK). cyclic olefin copolymer (COC), ethylene-vinyl acetate (EVA), polyoxymethylene (POM), polyacrylate (Acrylic), polyacrylonitrile (PAN), polybutadiene (PBD), polybutylene (PB), polycaprolactone (PCL), polyester (PE), polyurethane (PU), polyurea, polyvinylidene chloride (PVDC). polyolefin, polyolefin blend, poly(ethylene-co-propylene), PP/EPDM, polystyrene (PS), polybutylene-terephthalate (PBT), polyphenylene ether (PPE), polyvinyl acetate (PVA), polyacrylethersulphone (PAES), polyphenylene sulfide, Liquid Crystal Polymer (LCP), and a mixture thereof.

A preferred elastomer is a material specified by a high value of elongation at break and a low Tg (Glass Transition Temperature).

Elastomers for spray coating and cast and reaction injection molding (RIM) are commercially available. A special spray elastomeric polyurea has a Tg between −50° C. to −60° C., and a special spray elastomeric polyurethane has a Tg between −40° C. to −50° C. Other elastomers with a Tg lower than −40° C. are also known, such as natural rubber, fluorinated silicone rubber, styrene butadiene rubber, butadiene acrylonitrile rubber, isoprene rubber, butadiene rubber, chloroprene rubber, butyl rubber, silicone rubber, urethane rubber, thiokol rubber, fluoroelastomer, acrylate rubber, ethylene-propylene rubber, epoxide rubber, polypentenomer, and alternating rubber.

In the present invention, a preferred elastomer as substrate material is selected from the group consisting of polyurea elastomer, polyurethane elastomer, nature polyisoprene, cis-1,4-polyisoprene (natural rubber NR), trans-1,4-polyisoprene (gutta-percha), synthetic polyisoprene (IR), polybutadiene rubber (BR), chloroprene rubber (Neoprene, CR), poly(isobutylene-co-isoprene) (Butyl rubber, IIR), chlorobutyl rubber (CIIR), nitrile rubber (NBR), hydrogenated nitrile rubber (HNBR), ethylene propylene rubber (EPM), ethylene propylene diene rubber (EPDM), epichlorohydrin rubber (ECO), polyacrylic rubber (ACM, ABR), silicone rubber (VMQ), polyether block amide (PEBA), chlorosulfonated polyethylene (CSM), polysulfide rubber, fluorosilicone rubber (FVMQ), fluoroelastomer (FKM and FEPM), perfluoroelastomer (FFKM), polybutadiene-acrylonitrile, Tiokol, fluoroelastomer, polypentenomer, alternating rubber, polystyrene, polyether ester, polysulfide, and a mixture thereof.

A preferred thermoplastic elastomer as substrate material is selected from the group consisting of polystyrenic block copolymer, polyolefin blend, elastomeric alloy (TPE-v, TPV), thermoplastic polyurethane, thermoplastic copolyester, thermoplastic polyamide, and a mixture thereof.

In the present invention, a preferred fibre-reinforced polymer composite as substrate material, said fibre is selected from the group consisting of glass fibre, carbon fibre, Aramid fibre, wood fibre, and a mixture thereof, said polymer is selected from the group consisting of unsaturated polyester (UP, UPE), epoxy (EP), polyamide (PA, Nylon), vinyl ester, polyoxymethylene (POM), polypropylene (PP), polyethylene (PE), high density polyethylene (HDPE), polycarbonate (PC), acrylonitrile-butadiene-styrene (ABS), polyvinyl chloride (PVC), polyethylene terephthalate (PET), polybutylene-terephthalate (PBT), polylactic acid (PLA), vinyl ester (VE), and a mixture thereof.

In the present invention, a preferred injection molding as substrate material, the polymer used in injection molding is selected from the group consisting of thermoplastic, thermoset, elastomer, metal, and a mixture thereof.

In the present invention, a preferred casting, vacuum casting, and centrifugal casting as substrate material, the polymer used in casting, vacuum casting, and centrifugal cast is selected from the group consisting of thermoplastic, thermoset, elastomer, metal, and a mixture thereof.

In the present invention, a preferred reaction injection molding (RIM), structural reaction molding (SRIM), and reinforced reaction molding (RRIM), as substrate material, the reinforcing agent used in said RIM, SRIM, and RRIM is selected from the group consisting of glass fibre, carbon fibre, Aramid fibre, wood fibre, mica and a mixture thereof, thermosetting polymer in said RIM, SRIM, and RRIM is selected from the group consisting of polyurethane, polyurea, polyisocyanate, unsaturated polyester, polyester, polyphenol, epoxy, polyamide, vinyl ester, and a mixture thereof, Properly treated metal substrates painted with solvent-borne paints, UV curable paints, spray polyurethane, spray polyurea, powder coating, plasma or thermo-sprayed thermoplastic are all suitable.

In the present invention, a preferred solvent-borne coating as substrate material is selected from the group consisting of oxidative drying resin, amino resin, unsaturated polyester, epoxide, radiation curing, electron beam curing, vinyl polymer, alkyd resin, oligoethylene, oligopropylene, hydrocarbon resin, oligoether, oligoester, polyurethane, polyurea, epoxy, polyacrylic, polyamide, polyimide, polycarbonate, polydiene, polyester, polyether, polyfluorocarbon, polyolefin, polystyrene, polyvinyl acetal, polyvinyl chloride, polyvinylidene chloride, polyvinyl ester, polyvinyl ether, polyvinyl ketone, and a mixture thereof.

Application Method

In making composite for preventing ice adhesion in present invention, a coating may be required. The coating can applied onto a substrate using any wet coating method: such as dip, brush, roller, conventional spray, air atomizing spray, HVLP spray, airless spray, air-assisted airless spray, electrostatic spray, airless electrostatic spray, rotating electrostatic disk spray, rotating electrostatic bell spray, plural-component spray, trowel, pour, coil, flow, spin, capillary, screen coating, or printing techniques.

EXAMPLES

Objects and advantages and embodiments of this invention are further illustrated by the following examples, but the particular materials and amounts thereof recited in these examples, as well as other conditions and details, should not be construed to unduly limit this invention. These examples are merely for illustrative purposes only and are not to limit the scope of the appended claims.

Example 1 (Fluorinated Polyol)

A 4 liter autoclave equipped with a stirrer, gas inlet port, liquid injection port, liquid sampling port, and a thermocouple, was pre-dried. 925 g of tert-butyl acetate, 552 g of Versatic 9 vinyl ester (3.0 mol, VeoVa 9), and 87 g of hydroxypropyl vinyl ether (0.75 mol) were charged in under −20° C. and slowly stirred. The autoclave was evacuated for 10 minutes and purged five times with nitrogen at 5 Bars. The autoclave was then charged with tetrafluoroethylene (TFE) under 10 Bars of pressure and heated to 95° C. Then, the autoclave was charged with tetrafluoroethylene (TFE) containing 0.01% propane under 12 Bars of pressure. 1.0 ml 0.01M of di-tert-amyl peroxide (DTAP) in t-butyl acetate solution containing 1.74 g/L of di-tert-amyl peroxide was injected to initiate polymerization. Every 10 minutes thereafter, 1.0 ml of the 0.01M di-t-amyl peroxide in t-butyl acetate solution was injected. Additionally, TFE containing 0.01% propane was continuously charged in order to maintain the pressure at 12 Bars during the polymerization and the consumption of TFE was recorded. After 5 hours, a total of 383 g (3.83 mol) of TFE was charged and both the initiator solution and TFE supply were stopped. The mixture temperature was allowed to slowly rise to 120° C. and kept there for 1 hour. Afterward, the mixture in the autoclave was lowered to room temperature and then purged with nitrogen to remove unused TFE monomers, and the system was brought to atmospheric pressure. A total of 1957 g of product was recovered. 1024 g of hydroxyl polyfunctional fluorocopolymer solved in 933 g of tert-butyl acetate was obtained.

From the results of NMR and infrared absorption spectrum analysis, the hydroxyl polyfunctional fluorocopolymer has alternating sequences of repeating units of fluorinated monomer and non-fluorinated monomer. The mole ratio of TFE: vinyl ether versatate: hydroxybutyl vinyl ether was 50/40/10 (mol %). The solids percentage was 52.3%, the hydroxyl value is 40.4 mg KOH/g, equivalent weight 1389. The VOC is 0 g/L.

Example 2 (Fluorinated Polyol with High Fluorine Content)

The polymerization autoclave used in Example 1 was pre-dried, and charged with 800 g of tetrahydrofuran (THF). The autoclave was cooled to −18° C., de-aerated 3 times with 4 Bars of nitrogen, and 2 times with 2 Bars of tetrafluoroethylene (TFE). Then the autoclave was charged with TFE under 10 Bars of pressure. The mixture in the autoclave was heated to 108° C. and charged with TFE to raise the pressure to 25 Bars. 1 ml 0.01M of tert-amyl peroxy-2-ethylhexanoate in THF solution containing 2.3 g/L of tert-amyl peroxy-2-ethylhexanoate was injected into the autoclave to initiate polymerization. After 45 minutes, a continuous injection of liquid reactant/initiator was started with a flow rate of 1.0 ml/minute of solution containing 200 g of vinyl isobutyl ether (2.0 mol), 51 g of hydroxypropyl vinyl ether (0.50 mol), and 0.023 g of tert-amyl peroxy-2-ethylhexanoate (1.0E-4 mol) in 40 g of THF. Additionally, TFE was continuously charged in order to maintain the pressure at 25 Bars during the polymerization and the consumption of TFE was recorded. After 6 hours from the initiation of the polymerization, a total of 508 g of TFE (5.08 mol) was charged, and both the monomer/initiator solution and the TFE supply were stopped.

The mixture temperature was allowed to rise to 125° C. and kept there for 1 hr. The mixture in the autoclave was lowered to room temperature and then purged with nitrogen to remove unused monomers, and the system was brought to atmospheric pressure. The obtained finely dispersed phase separated hydroxyl polyfunctional fluorocopolymer in THF solution appeared transparent and was removed from the autoclave. 750 g of hydroxyl polyfunctional fluorocopolymer with high fluorine content dispersed in 830 g of THF was recovered as transparent solution. The transparent appearance gradually turned to translucent after a week.

From the results of NMR and infrared absorption spectrum analysis, the hydroxyl polyfunctional fluorocopolymer had random block sequences of repeating units of TFE, repeating units of vinyl isobutyl ether, and repeating units of hydroxypropyl vinyl ether with a ratio of: 10/4/1 (mol %). The hydroxyl value is 37.2 mg KOH/g. The solid is 47.5%, equivalent weight 1508.

Example 3 (Isocyanato Fluorinated Prepolymer)

A 2,500 ml five-neck round-bottom glass flask having a heating/cooling jacket and equipped with turbine stirrer, thermocouple, nitrogen inlet, liquid dripping funnel, and condenser connected with a nitrogen bubbler was pre-dried. 500 g of hydroxyl polyfunctional fluorinated copolymer in tert-butyl acetate solvent obtained by Example 1 (52.3% solid, hydroxyl value 40.4 mg KOH/g, equivalent weight 1389), and 150 ml toluene was added. Nitrogen was bubbled into the solution under slow stirring. The flask was heated to a boiling temperature. The refluxing solvent was past through 40 cm high, 18 mm O.D. column filled with dried 5 A molecular sieve, and returned to the flask. The refluxing was held for 1 hour. Then, the toluene was distilled out. The system was cooled to 25° C. 44 g of isophorone diisocyanate (1-isocyanatomethyl-1,3,3-trimethyl-5-isocyanato-cyclohexane, Bayer, Desmodur® I, Assay ≥99.5%, NCO ≥37.7%, equivalent weight 111) was admitted to the stirred mixture dropwise slowly over a one hour under a nitrogen blanket. The temperature of the reaction mixture was kept below 40° C. to 50° C. by adjusting the drip rate and the medium temperature in the cooling jacket. To avoid a gelatin, the addition of isocyanate should be processed without interruption. The stirred reaction mixture was kept under 70° C. to 80° C. for an additional hour. The free isocyanate content was measured. The system was reduced to room temperature, and 2 ml of hydroquinone 10% solution in butyl acetate was added. A total of 510 g of polyfunctional isocyanato fluorinated prepolymer in tert-butyl acetate solution was obtained. The isocyanato functional fluorinated prepolymer had a solid content of 59.6% and NCO content of 2.62%, equivalent weight 1612.

Example 4 (Perfluoropolymer Powder and Fluorinated Polyol Blend)

A 4-neck 500 ml borosilicate sonochemical reaction vessel equipped with mechanical stirring in the center neck, thermocouple in a side neck, pressure balance in a side neck, a 5 inch long and ¾ inch diameter ultrasonic horn (probe) in a side neck with bushing and an o-ring seal. A 600 Watt high intensity ultrasonic processor power supplier supplied the 20 kHz electricity into the horn. 50 g of fluorinated polyol obtained by Example 1 (52.3% solid, hydroxyl value 40.4 mg KOH/g, equivalent weight 1390), 50 g of fluorinated polyol with high fluorine content obtained by Example 2 (solid 47.5%, hydroxyl value 37.2 mg KOH/g. equivalent weight 1502), 75 g PTFE powder (DuPont, Zonyl® MP 1000, average agglomerate size of 8-15 micron, ultimate reduction to 200 nanometer), and 250 ml of methyl ethyl ketone were mixed in said reaction vessel which was placed in a ice-salt (1:3 ratio) bath (−20° C.). The contents were cooled by stirring until the temperature reached 0° C. The mixture was illuminated with an ultrasound (50% pulse mode) for 15 minutes. The temperature of the mixture rose to 17° C. After stopping ultrasonic illumination the mixture was kept under room temperature. A total of 366 g of a translucent blend of PTFE powders with polyfunctional fluoropolymer was obtained.

Example 5 (Perfluoropolymer Powder and Fluorinated Polyol Blend)

In a 2 liter net volume high speed closed vertical bead mill with external water cooling 1,125 g (300 ml) of zirconia beads (Yttia stabilized, 0.4-0.6 mm), 200 g of TPFE micron powder (DuPont, Zonyl® MP 1600, average agglomerate size of 4-12 micron, ultimate reduction to 200 nanometer), and 500 ml of tert-butyl acetate were charged. Milling continues for 1 hr at 2900 RPM speed. The beads were filtered out and washed with total 80 ml of tert-butyl acetate three times. The recovered finely dispersed PTFE in tert-butyl acetate was collected in a 2,000 ml glass beaker. The total recovered dispersion was 636 g. The total recovered PTFE was 184 g at a yield of 92%. 165 g of fluorinated polyol obtained in Example 1 was mixed in, which produced a cloudy liquid. 800 g of PTFE powder dispersed in fluorinated polyol was obtained.

Example 6 (Isocyanato Urea-Siloxane Prepolymer)

A 2,500 ml five-neck glass round-bottom jacketed flask such as in Example 3 was pre-dried. 150 ml of urethane grade xylene, 150 ml of N,N-dimethylacetamide with low water content, 0.20 g of dibutyltin dilaurate (total tin 18%), and 172 g of hexamethylene-1,6-diisocyanate (Bayer, Desmodur® H, HDI, Assay ≥99.5%, NCO ≥49.7%, molecular weight of 168, equivalent weight 84) were added. Nitrogen was bubbled into the solution under slow stirring for 30 minutes. The system temperature was heated to 35° C. 500 g of alpha, omega-bis(N-aminopropyl) polydimethylsiloxane (Gelest®, DMS-A12, $NH_2$ 3.0-3.2%, molecular weight 900-1000) was dripped slowly into the stirred solution via the dripping funnel over a course of 2 hours under a nitrogen blanket. The system temperature was kept between 30-45° C. by adjusting the dripping rate and the cooling medium temperature in the jacket. After the dripping was finished, the temperature of the reaction mixture in the flask was heated to 60° C. for 1 hour. The prepolymer formation was monitored by FT-IR spectroscopy, 3450 $cm^{-1}$ stretching peak of OH disappearance and 3300 $cm^{-1}$ stretching peak of NH appearance. 2 ml of hydroquinone 10% solution in butyl acetate was added. The mixture had been kept under room temperature for an additional 12 hrs. The total solids were adjusted to 50% by the addition of xylene. The resulting contents were removed from the flask. A total 670 g of polyfunctional isocyanato urea-siloxane prepolymer in 670 g of xylene/N,N-dimethylformamide solution was obtained. The isocyanato urea-siloxane prepolymer had a solids content of 50%, and NCO content 6.46%, equivalent weight 650.

Example 7 (Isocyanato Urea-Siloxane Prepolymer)

The 2,500 ml five-neck, round-bottom jacketed glass flask used in Example 3 was pre-dried. 150 ml of N,N-dimethylformamide (DMF, Alpha Aesar, water≤20 ppm), 150 ml of xylene, 275 g of methylene bis(4-cyclohexyl isocyanate) (Bayer, Desmodur® W, Assay ≥99.5%, NCO ≥31.8%, equivalent weight 131) were added. Nitrogen was bubbled into the solution under slow stirring for 30 minutes. The system temperature was kept at 4° C. 1375 g of alpha, omega-bis(N-ethyl aminoisobutyl) polydimethylsiloxane (Gelest®, DMS-A214, NH 1.0-1.4%, and molecular weight of 2500-3000) was slowly dripped into the stirred solution via the dripping funnel over the course of 2 hours under nitrogen bubbling. The system temperature was kept between 0-10° C. After the dripping finished, the temperature of the reaction mixture in the flask was allowed to rise to 25° C. for 2 hours. 2 ml of hydroquinone 10% solution in butyl acetate was added. The mixture was then kept under room temperature for an additional 24 hrs. The resulting content was removed from the flask. The total solids were adjusted to 50% by the addition of xylene. A total of 1640 g of polyfunctional isocyanato siloxane prepolymer in 1640 g of N,N-dimethylformamide/xylene solution was obtained. The isocyanato functional urea-siloxane prepolymer had a solids content of 50%, and NCO content of 2.56%, equivalent weight 1640.

Example 8 (Polyaspartic Ester Amine Functional Siloxane)

The 2500 ml five-neck, jacketed round-bottom glass flask used in Example 3 was pre-dried. 1000 g (0.5 mol) of alpha, omega-bis(3-aminopropyl) polydimethylsiloxane (Gelest®, DMS-A13, $NH_2$ 1.5%, molecular weight 2000) was charged in. Nitrogen was bobbled in the solution under slow stirring for 15 minutes. The system temperature has been kept at 15° C. 180 ml of xylene and 192 g of diethyl maleate (1.08 mol, Assay 97%, and molecular weight 172) was dripped in slowly to the stirred solution via the dripping funnel over 2 hours under nitrogen bubbling. The system temperature was kept between 40° C. After finish dripping the temperature of reaction mixture in the flask was risen to 80° C. for 8 hours and 90° C. for 12 hour. The reaction mixture was kept under ambient temperature for 24 hrs. The total solid is adjusted to 85% by addition of xylene. The resulting content was removed from the flask. The solid content was adjusted to 85% by addition of xylene. A total 1175 g of polyaspartic ester siloxane amine based on bis(3-aminopropyl) polydimethylsiloxane in 207 g of xylene was obtained. The polyaspartic ester amine functional polydimethylsiloxane had solids content 85%, NH content 1.1%, and equivalent weight 1170.

Example 9 (Composite for Preventing Ice Adhesion)

A typical material preparation for coating was as following: 3.661 g of blend of PTFE perfluoropolymer powder and fluorinated polyol obtained in Example 4, 0.131 g of aliphatic polyisocyanate (Bayer, Desmodur® N3600, and equivalent weight 183) and 0.012 g of bismuth carboxylate catalyst (King Industries, K KAT® 348, 75% solid) were weighted into a test tube. The mixture was stirred vigorously. Catalytic reaction composition for phase separated IPN material for superhydrophobic surfaces was prepared. Preparation was repeated for each substrate sample.

Eight pieces of 100 mm×160 mm steel plate coated with epoxy primer were sanded with 220 grit (Norton, Wet/Dry) sandpaper as subtracts. The substrates for the samples were labeled. Each steel plate was coated with prepared material with Double Blade Micrometer Film Applicator to coat wet film thickness of 127 micron (5 mils). The samples were cured and dried under ambient temperature for 1 week. The surfaces of all substrates were hand sanded by grit designation 240 sandpapers (3M, Wet/Dry) in a water bath. The samples were rinsed with water during sanding operation until superhydrophobic phenomenon appeared. When superhydrophobic phenomenon appeared, the operation of hand sanding was removed onto next area until whole substrate surface become superhydrophobic. Sample surfaces were rinsed with ethanol three times and dried in atmospheric for 4 hours. Polydimethylsiloxane fluid (Dow Corning, Xiameter® PMX-200 200 cSt) was applied onto the surfaces of all samples by wipe tissue (Kodak lens cleaning paper) wetted by polydimethylsiloxane fluid on sample surfaces. The samples of composites were tested for ice adhesion tests. The composite for preventing ice adhesion were passed the tests.

Ice adhesion tests were done by ice separation. An ultra low freezer (LFZ-60 L, −60° C., upright) was modified to set at −40° C. temperature, All shelves were held on horizontal positions. Samples of composites were placed in and held by clamps with face up on a lab rack. After moving in, 20 separated water drops with each 1.00 ml volume were delivered with lab pipette on each test composite. After freezer reaching −40° and keeping for 1 hour, the rack was turn to perpendicular position. The separated ice drops were skidded off the composites. After counting remained ice drops on composite surfaces if any, the samples were removed from the freezer to remove ice drops. The procedure was repeated 20 times for each composite sample. If a composite shown that 80% of ice drops were separated during 20 repeat icing/ice removal cycles, It define ice phobic.

Example 10 (Composite for Preventing Ice Adhesion)

A 2 liter high speed horizontal closed bead mil with external water cooling 1,125 g (300 ml) of Zirconia beads (Yttia stabilized, 0.4-0.6 mm), 70 g of TPFE micron powder (DuPont, Zonyl® MP 1600, average agglomerate size of 4-12 micron, ultimate reduction to 200 nanometer), 200 g of polyfunctional fluorinated polyol (52.3% solid, hydroxy value 40.4 mg KOH/g, equivalent weight 1389) obtained in Example 1, and 400 ml of tert-butyl acetate were charged. Milling continues for 1 hr at 2800 RPM speed. The beads were filtered out by mill, and washed with total 180 ml tert-butyl acetate three times. The recovered fine dispersed PTFE and polyfunctional fluorinated polyol in tert-butyl acetate was collected in a 1,000 ml glass beaker. 4.5 g of catalyst of dibutyltin dilaurate (25%) was mixed in. The mixed bland total weight was 716 g. The total solid percentage is 27.4%. The hydroxyl fluoropolymer percentage was 14.1%. The calibrated total recovery solid was 169 g and yield 97%. It was a cloud appearance liquid. 2.022 g of PTFE powder/fluorinated polyol blend, 2.238 g of isocyanato functional fluorinated prepolymer (59.6% solid, NCO contents 2.62%, and equivalent weight of 1612) obtained in Example 3, and 2 drops of tin catalyst (Air Products, Dabco® T-12) and 0.031 g were weighted in a test tube. The content was stirred vigorously. The phase separated IPN for superhydrophobic material was prepared. The preparation was repeated for each substrate.

Eight block of 102 mm×150 mm×20 mm micro closed cell polyurethane foams by reaction injection molding (RIM) were lightly sanded with 220 grit sandpaper (Norton, Wet/Dry) as subtracts. Each block was coated with material prepared with Wire Wound Rod having wire size #50. The coats had wet film thickness of 127 micron (5 mils). The samples were cured and dried under ambient temperature for 1 week. The substrates were hand sanded by grit designation 240 sandpapers (3M, Wet/Dry) in a water bath. The samples were rinse with water during sanding operation until superhydrophobic phenomenon appeared during the sanding.

Sample surfaces were rinsed with ethanol three times and dried in atmospheric for 4 hours. Poly(phynylmethylsiloxane-co-dimethylsiloxane) fluid (Gelest, PMM-1025, 500 cSt) was applied onto the surfaces of all samples by wipe tissue (Kodak lens cleaning paper) wetted by poly(phynylmethylsiloxane-co-dimethylsiloxane) fluid on sample surfaces. The samples with the composite for preventing ice adhesion were tested for ice adhesion. All samples were passed the tests.

Example 11 (Composite for Preventing Ice Adhesion)

40.0 g of bland of perfluoropolymer PTFE powder dispersed in polyfunctional fluorinated polyol obtained in Example 5, 0.624 g of aliphatic polyisocyanate (Bayer, Desmodur® N3600, and equivalent weight 183), and 0.102 g of tin-based catalyst (Air Products, Dabco® T-120) in 18 ml of tert-butyl acetate were weighted into a 100 ml beaker. It formed reactive composition for superhydrophobic surfaces with cloud appearance after vigorously stirring.

Dried, filtrated air was supplied to a gravity feed sprayer. The air pressure was set to 35 psig. Composition #110221 was added into a cup of sprayer gun. 20 ml tert-butyl acetate and 2.5 ml acetone were added and mixed.

Six dried, anodized aluminum plates of size 100 mm×250 mm which was pretreated with gamma-aminopropyl trimethyoxy silane were used as substrates. 3 thin sprayed coating layers were applied to each substrate. The coated substrates were kept in ambient temperature on a shelf for 5 days. The substrates were hand sanded by grit designation 240 sandpapers (3M Wet/Dry) in a water bath. The samples were rinse with water during sanding operation until superhydrophobic phenomenon appeared during the sanding. Sample surfaces were rinsed with methyl ethyl ketone three times and dried in atmospheric for 4 hours. Poly(diethylsiloxane) fluid (Gelest, DES-T23, 200-400 CST) was applied onto the surfaces of all samples by wipe tissue (Kodak lens cleaning paper) wetted by polydiethylsiloxane fluid on sample surfaces. The samples with the composite for preventing ice adhesion were tested for ice adhesion, and passed tests.

Example 12 (Isocyanato Fluorinated/Aliphatic Prepolymer)

A 1,000 ml five-neck round-bottom glass flask having a heating/cooling jacket and equipped with stirrer, thermocouple, nitrogen inlet, liquid dripping funnel, and condenser connected with a vacuum pump system was pre-dried. 159.3 g of hydroxyl polyfunctional fluorinated copolymer in tert-butyl acetate solvent obtained by Example 1 (52.3% solid, hydroxyl value 40.4 mg KOH/g, equivalent weight 1389), 200.0 g of polycaprolactone polyol (Bayer, Baycol® AD5055, diol, hydroxyl value 56.0 mg KOH/g, equivalent weight 1,000), 80.0 g of polycarbonate polyol (Bayer, Desmophen® C2200, diol, hydroxyl value 56.0 mg KOH/g, equivalent weight 1,000), 40.0 g of polyether polyol (Bayer, Desmophen® 2060 BD, diol, hydroxyl value 28.5 mg KOH/g, equivalent weight 1,000), 60.0 g of polyether polyol (Bayer, Desmophen® 3061 BD, triol, hydroxyl value 56.0 mg KOH/g, equivalent weight 1,000), and 4.51 g of trimethylolpropane (hydroxyl value 1247 mg KOH/g, molecular weight 135.1, purity 99.8%), and 40.0 g of tert-butyl acetate were added. Glass flask was heated with nitrogen gas bubbled under slow stirring. The flask was heated to keep at boiling temperature. The refluxing solvent was past through 40 cm high, 18 mm O.D. column filled with dried 5 A molecular sieve, and returned to the flask. The refluxing was held for 1 hour. Then the system was cooled to 30° C. 123.5 g of isophorone diisocyanate (1-isocyanatomethyl-1,3,3-trimethyl-5-isocyanato-cyclohexane, (Bayer, Desmodur® I, Assay ≥99.5%, NCO ≥37.7%, equivalent weight 111) was admitted to the stirred mixture dropwise slowly over a one hour under a nitrogen blanket. The temperature of the reaction mixture was kept below 40° C. to 50° C. by adjusting the drip rate and the medium temperature in the cooling jacket. To avoid a gelatin, the addition of isocyanate should be processed without interruption. The stirred reaction mixture was kept under 70° C. to 80° C. for an additional 2 hours. The free isocyanate content was measured. The system was reduced to room temperature. 1 ml of 10% hydroquinone in butyl acetate was added. A total of 672 g of polyfunctional isocyanato fluorinated/aliphatic prepolymer was obtained. The isocyanato functional fluorinated/aliphatic prepolymer had solid content of 75%, NCO content of 3.93%, and equivalent weight 1067.

Example 13 (Hydroxyl Functional Aliphatic Prepolymer)

A 1,000 ml five-neck round-bottom glass flask having a heating/cooling jacket and equipped with stirrer, thermocouple, nitrogen inlet, liquid dripping funnel, and condenser connected with a vacuum pump system was pre-dried. 100.0 g of polycaprolactone polyol (Bayer, Baycol® AD5055, diol, hydroxyl value 56.0 mg KOH/g, equivalent weight 1,000), 80.0 g of polycarbonate polyol (Bayer, Desmophen® C2200, diol, hydroxyl value 56.0 mg KOH/g, equivalent weight 1,000), 20.0 g of polyether polyol (Bayer, Desmophen® 2060 BD, diol, hydroxyl value 28.5 mg KOH/g, equivalent weight 1,000), 120.0 g of polyether polyol (Bayer, Desmophen® 3061 BD, triol, hydroxyl value 56.0 mg KOH/g, equivalent weight 1,000), and 16.1 g of trimethylolpropane (hydroxyl value 1247 mg KOH/g, molecular weight 135.1, purity 99.8%), and 80.0 g of tert-butyl acetate were added. Glass flask was slowly heated with nitrogen gas bubbled under slow stirring. The flask was heated to keep at boiling temperature. The refluxing solvent was past through 40 cm high, 18 mm O.D. column filled with dried 5 A molecular sieve, and returned to the flask. The refluxing was held for 1 hour. Then the system was cooled to 35° C. 60.0 g of isophorone diisocyanate (1-isocyanatomethyl-1,3,3-trimethyl-5-isocyanato-cyclohexane, (Bayer, Desmodur® I, Assay ≥99.5%, NCO ≥37.7%, equivalent weight 111) was admitted to the stirred mixture dropwise slowly over a one hour under a nitrogen blanket. The temperature of the reaction mixture was kept below 40° C. to 50° C. by adjusting the drip rate and the medium temperature in the cooling jacket. To avoid a gelatin, the addition of isocyanate should be processed without interruption. The stirred reaction mixture was kept under 70° C. to 75° C. for an additional 2 hours. Add 2.0 g of tin complex catalyst (Air Products, Dabco 112) and the stirred reaction mixture was kept under 70° C. to 75° C. for an additional 2 hours. The free isocyanato group was measured. The system was reduced to room temperature. 1 ml of 10% hydroquinone in butyl acetate was added. Product solid percentage was adjusted to 75% by addition of tert-butyl acetate. A total of 396 g of polyfunctional isocyanato fluorinated/aliphatic prepolymer was obtained. The hydroxyl functional prepolymer had solid 75%, hydroxyl value of 19.28, and equivalent weight 2911.

Example 14 (Composite for Preventing Ice Adhesion)

58.2 g of isocyanato fluorinated/aliphatic prepolymer obtained by Example 12 (solid content of 75%, NCO content of 3.93%, and equivalent weight 1067), and 20.1 g of hydroxyl functional aliphatic prepolymer (Solid content 75%, hydroxyl value of 19.28, and equivalent weight 2911) were mixed in a 200 ml beaker. 40 ml of tert-butyl acetate, 5 ml of acetone has added into the beaker. The mixture was stirred for 3 minutes by glass rod. The content was poured into a cup of gravity feed sprayer gun. Dried, filtrated air with 35 PSI pressure was supplied to the gravity feed sprayer.

Substrates were following: Six pieces of ethanol pre-cleaned glass fibre-reinforced unsaturated polyester (UP, UPE) composite of size 100 mm×160 mm were dried. Six pieces of ethanol pre-cleaned EPDM thermoplastic of size 110 mm×150 mm were dried.

3 thin sprayed coating layers were applied to each substrate. The coated substrates were kept in ambient temperature on a shelf for 5 days. The substrates were hand sanded by grit designation 240 sandpapers (3M Wet/Dry) in a water bath. The samples were wet sanded until whole surface became superhydrophilic. All samples were dried by atmospheric air.

Sample surfaces were wiped with methyl ethyl ketone five times and dried in atmospheric for 2 hours. Poly(diethylsiloxane) fluid (Gelest, DES-T23, 200-400 CST) was applied onto the surfaces of all samples by wipe tissue (Kodak lens cleaning paper) wetted by polydiethylsiloxane fluid on sample surfaces. The samples with the composite for preventing ice adhesion were tested for ice adhesion. All samples passed the tests.

Example 15 (Composite for Preventing Ice Adhesion)

Pilot tubes speed sensor with complicated shape of surfaces. The material made of the surfaces was unknown. The sensor was partially hand sanded with grit 240 sandpaper, and following with oxygen plasma etching in vacuum chamber of a PE-100 bench top plasma etching system. The etching was performed under oxygen ions exposed for 60 min by 300 W radio frequencies at 13.56 MHz. After oxygen plasma etching the whole surfaces were shown superhydrophilic.

Sample surfaces were wiped with methyl ethyl ketone five times and dried in atmospheric for 2 hours. Perfluoropolyether (Nye Lubricant, Inc., UniFlor® 8511, 65 cSt) was applied onto the surfaces of all samples by wipe tissue (Kodak lens cleaning paper) wetted by perfluoropolyether oil on sample surfaces. The sample of the sensor with the composite for preventing ice adhesion was tested for ice adhesion, and passed the tests.

Example 16 (Composite for Preventing Ice Adhesion)

Hydrophobic polymer samples of available materials were tested for composite for preventing ice adhesion with simple process of: (a) wet sanding with grit 240 sandpaper, and (b) apply hydrophobic, low freezing point liquids: poly(diethylsiloxane) fluid (Gelest, DES-T23, 200-400 CST) onto superhydrophilic surfaces formed.

Ice adhesion tests shown following hydrophobic polymers passed the tests: high density polyethylene, low density polyethylene, polyvinyl chloride, polypropylene, polyethylene terephthalate, polyamide, polyimide, polysulfone, polyether ether ketone. Elastomer samples passed ice adhesion tests are polyurethane rubber, butyl rubber, silicone rubber, fluoroelastomer, ethylene-propylene rubber, polypentenomer, and chloroprene rubber.

Example 17 (Composite for Preventing Ice Adhesion)

In a 250 ml glass beaker 25 g of polyfunctional fluorinated polyol obtained by Example 1 (52.3% solid, hydroxyl value 40.4 mg KOH/g, equivalent weight 1390), 25 g of polyfunctional fluorinated polyol with high fluorine content obtained by Example 2 (solid 47.5%, hydroxyl value 37.2 mg KOH/g. equivalent weight 1502), 12 g of carbinol terminated polydimethylsiloxane (DMS-C21, Gelest, molecular weight 4500-5500, non-silicone 4%) were mixed. 12.5 g of aliphatic polyisocyanate (Desmodur N3600, Bayer, equivalent weight 183) was mixed in. 40 ml of xylene and 1.0 g of bismuth carboxylate catalyst (King Industries, K KAT 348, 75% solid) were mixed in. The content was thoroughly mixed.

The content was poured into a cup of gravity feed sprayer gun.

Six pieces of ethanol pre-cleaned chloroprene rubber (Neoprene) of size 80 mm×120 mm×12 mm were dried.

3 thin sprayed coating layers were applied to each substrate. The coated substrates were kept in ambient temperature on a shelf for 7 days. The substrates were hand sanded by grit designation 240 sandpapers (3M Wet/Dry) in a water bath. The samples were wet sanded until whole surface became superhydrophilic. All samples were dried by atmospheric air.

Sample surfaces were wiped with methyl ethyl ketone five times and dried in atmospheric for 2 hours. Poly(diethylsiloxane) fluid (Gelest, DES-T23, 200-400 CST) was applied onto the surfaces of all samples by wipe tissue (Kodak lens cleaning paper) wetted by polydiethylsiloxane fluid on sample surfaces. The samples with the composite for preventing ice adhesion were tested for ice adhesion. All samples passed the tests.

Example 18 (Composite for Preventing Ice Adhesion)

In a 500 ml glass beaker 7.5 g of polyaspartic ester amine resin (Desmophen NH 1520, Bayer, amine value 189-193, equivalent weight 290), 4.5 g of polyaspartic ester amine resin (Desmophen NH 1220, Bayer, amine value 240-234, equivalent weight 226-234), 6.2 g of hydride terminated dimethylsiloxane (DMS-H11, Gelest, molecular weight 1000-1100, H 0.2%, equivalent weight 550), 6 g of silanol terminated polydimethylsiloxane (DMS-S14, Gelest, molecular weight 700-1500, OH 3.0-4.0%, equivalent weight 550), 77.5 g of polyfunctional isocyanato fluorinated prepolymer obtained in Example 3 (solids content 60%, and equivalent weight 1612), 115 ml g of tert butyl acetate, 2 g of dibutyltin diisooctylmaleate (tin 15%) were mixed in. The content was poured into a cup of gravity feed sprayer gun.

Six pieces of MEK cleaned carbon fiber-reinforced polyimide resin of size 80 mm×120 mm were dried.

3 thin sprayed coating layers were applied to each substrate. The coated substrates were kept in ambient temperature on a shelf for 4 days. The substrates were hand sanded by grit designation 240 sandpapers (3M Wet/Dry) in a water bath. The samples were wet sanded until whole surface became superhydrophilic.

Dried sample surfaces were wiped with methyl ethyl ketone five times and dried in atmospheric for 2 hours. Poly(diethylsiloxane) fluid (Gelest, DES-T23, 200-400 CST) was applied onto the surfaces of all samples by wipe tissue (Kodak lens cleaning paper) wetted by polydiethylsiloxane fluid on sample surfaces. The samples with the composite for preventing ice adhesion were tested for ice adhesion. All samples passed the tests.

Example 19 (Composite for Preventing Ice Adhesion)

In a 500 ml glass beaker 104 g of polyaspartic ester amine functional polydimethylsiloxane obtained in Example 6 (solids 85%, NH content 1.28%, and equivalent weight 1170), 139 g of polyfunctional isocyanato fluorinated prepolymer obtained in Example 3 (59.6% solid, NCO 2.6%, equivalent weight 1612), and 60 ml of xylene were added. After thoroughly mixing, 2 g of dibutyltin dineodecanoate (tin 18%) was mixed in. The content was poured into a cup of gravity feed sprayer gun. 20 pieces of ethanol cleaned injection molding polyamide resin of size 100 mm×120 mm were dried.

3 thin sprayed coating layers were applied to each substrate. The coated substrates were kept in ambient temperature on a shelf for 4 days. The substrates were abrasive blasted with aluminum oxide by US sieve designation 220 with potable siphon feed abrasive blaster (MXS11004) and a ceramic nozzle (MXS11001). The abrasive blasted samples were checked for superhydrophilic properties. 8 pieces were selected for making composite.

Dried sample surfaces were wiped with methyl ethyl ketone five times and dried in atmospheric for 2 hours. Poly(diethylsiloxane) fluid (Gelest, DES-T23, 200-400 CST) was applied onto the surfaces of all samples by wipe tissue (Kodak lens cleaning paper) wetted by polydiethylsiloxane fluid on sample surfaces. The samples with the composite for preventing ice adhesion were tested for ice adhesion. All samples passed the tests.

Example 20 (Composite for Preventing Ice Adhesion)

In a 500 ml glass beaker 80 g of polyfunctional fluorinated polyol obtained in Example 2 (hydroxyl value 37.2 mg KOH/g, solid 47.5%, equivalent weight 1502), 34 g of isocyanato urea-siloxane prepolymer obtained in Example 4 (solids content 50%, NCO 6.46%, equivalent weight 650), and 60 ml of xylene were added. After thoroughly mixing, 3 g of zirconium tetrakis(2,4-pentanedionate) complex (total zirconium 20%) was mixed in. The content was poured into a cup of gravity feed sprayer gun. 15 pieces of ethanol cleaned butyl rubber samples of size 80 mm×120 mm×12 mm were dried.

3 thin sprayed coating layers were applied to each substrate. The coated substrates were kept in ambient temperature on a shelf for 7 days. The substrates were abrasive blasted with aluminum oxide by US sieve designation 220 with potable siphon feed abrasive blaster (MXS11004) and a ceramic nozzle (MXS11001). The abrasive blasted samples were checked for superhydrophilic properties. 8 pieces were selected for making composite.

Dried sample surfaces were wiped with methyl ethyl ketone five times and dried in atmospheric for 2 hours. Polydimethylsiloxane fluid (Dow Corning, Xiameter® PMX-200 200 cSt) was applied onto the surfaces of all samples by wipe tissue (Kodak lens cleaning paper) wetted by polydiethylsiloxane fluid on sample surfaces. The samples with the composite for preventing ice adhesion were tested for ice adhesion. All samples passed the tests.

The invention claimed is:
1. A composite for preventing ice adhesion comprising a hydrophobic liquid adsorbed onto roughened hydrophobic polymer; wherein said hydrophobic liquid has a low freezing point, high flash point, resistance to UV and chemicals, and is selected from the group consisting of poly(pentamethylcyclopentasiloxane), polydiethylsiloxane, polydimethylsiloxane, poly(dimethylsiloxane-co-diethylsiloxane), poly(ethylmethylsiloxane), poly(methyltrifluoropropylsiloxane), poly(methyltrifluoropropylsiloxane-co-dimethylsiloxane), and a mixture thereof; and wherein said roughened hydrophobic polymer has an average surface roughness (RMS) between 12 to 15 microns with surface structures that minimize potential contact area with solids/water so as to minimize loss of said hydrophobic fluid with each icing/ice removal cycle.

2. The composite of claim 1, wherein said hydrophobic polymer is selected from the group consisting of polyurethane, polyurea, fluorinated polyurethane, fluorinated polyurea, polysiloxane, interpenetrating polymer network material, polyethylene, polyvinyl chloride, polypropylene, polyethylene terephthalate, polymethylmethacrylate, polycarbonate, acrylonitrile-butadiene-styrene, polyamide, polyimide, polysulfone, polyamide-imide, polyetherimide, polyether ether ketone, polyaryletherketone, cyclic olefin copolymer, ethylene-vinyl acetate, polyoxymethylene, polyacrylate, polyacrylonitrile, polybutadiene, polybutylene, polycaprolactone, polyester, polyvinylidene chloride, polyolefin, polyolefin blend, cycloolefin polymer, poly(ethylene-co-propylene), polybutylene-terephthalate, polyvinyl acetate, polyacrylethersulphone, liquid crystal polymer, polyurea elastomer, polyurethane elastomer, natural polyisoprene, cis-1,4-polyisoprene, trans-1,4-polyisoprene, synthetic polyisoprene, polybutadiene rubber, chloroprene rubber, neoprene, poly(isobutylene-co-isoprene), chlorobutyl rubber, nitrile rubber, epoxide rubber, hydrogenated nitrile rubber, ethylene propylene rubber, ethylene propylene diene rubber, epichlorohydrin rubber, polyacrylic rubber, polypentenamer, polyalkenamer, polyoctenamer, polynorbornene, poly(dicyclopetadiene), polycyclorene rubber, butadiene-acrylonitrile rubber, silicone rubber, polyether block amide, chlorosulfonated polyethylene, polysulfide rubber, fluorosilicone rubber, fluoroelastomer, perfluoroelastomer, polypentenomer, alternating rubber, polyether ester, elastomeric alloy, thermoplastic polyurethane, thermoplastic copolyester, thermoplastic polyamide, radiation curable resin, electron beam curable resin, oligoethylene, oligopropylene, hydrocarbon resin, oligoether, oligoester, polyvinyl acetal, polyvinyl ketone, polylactic acid, polyisocyanate resin, and a mixture thereof.

3. The composite of claim 1, wherein said hydrophobic polymer is an interpenetrating polymer network material comprising: (6a) at least a polyfunctional reactant having a plurality of functional groups; (6b) at least a polyfunctional isocyanate selected from the group consisting of monomeric diisocyanate, oligomeric polyisocyanate, polyfunctional isocyanate prepolymer, modified polyisocyanate and a mixture thereof; (6c) at least a catalyst, said catalyst is selected from the group consisting of tertiary amine, organometallic complex, and a mixture thereof.

4. The composite of claim 3, wherein said polyfunctional reactant comprises: (7a) at least an aliphatic reactant selected from the group consisting of aliphatic polyol, aliphatic polyalkylamine, and a mixture thereof, wherein said aliphatic polyol is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether) glycol, castor polyol, vegetable polyol, and a mixture thereof, and wherein said aliphatic polyalkylamine is selected from the group consisting of polyaspartic ester amine, aldimine, polycaprolactone polyalkylamine, polycarbonate polyalkylamine, polyether polyalkylamine, polyester polyalkylamine, polyacrylic polyalkylamine, and a mixture thereof; and (7b) at least a chain extender selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl) ethylenediamine, and a mixture thereof.

5. The composite of claim 3, wherein said polyfunctional reactant comprises: (8a) at least a fluorinated reactant having a plurality of functional groups, wherein said functional group is selected from the group consisting of hydroxyl, alkylamino, and a mixture thereof; (8b) at least a polyfunctional aliphatic reactant selected from the group consisting of aliphatic polyol, aliphatic polyalkylamine, and a mixture thereof, wherein said aliphatic polyol is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether) glycol, castor polyol, vegetable polyol, and a mixture thereof, and wherein said aliphatic polyalkylamine is selected from the group consisting of polyaspartic ester amine, aldimine, polycaprolactone polyalkylamine, polycarbonate polyalkylamine, polyether polyalkylamine, polyester polyalkylamine, polyacrylic polyalkylamine, and a mixture thereof; and (8c) at least a chain extender selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl) ethylenediamine, and a mixture thereof.

6. The composite of claim 3, wherein said polyfunctional reactant comprises of: (9a) at least a fluorinated reactant having a plurality of functional groups, wherein said functional group is selected from the group consisting of hydroxyl, alkylamino, and a mixture thereof; and (9b) at least a functional siloxane reactant having a plurality of reactive groups, wherein said reactive group is selected from the group consisting of amino, carbinol, silanol, hydride, vinyl, isocyanato and a mixture thereof.

7. The composite of claim 3, wherein said polyfunctional reactant comprises: (10a) at least a fluorinated reactant having a plurality of functional groups, wherein said functional group is selected from the group consisting of hydroxyl, alkylamino, and a mixture thereof; (10b) at least a polyfunctional aliphatic reactant selected from the group consisting of aliphatic polyol, aliphatic polyalkylamine, and a mixture thereof, wherein said aliphatic polyol is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether) glycol, castor polyol, vegetable polyol, and a mixture thereof, and wherein said aliphatic polyalkylamine is selected from the group consisting of polyaspartic ester amine, aldimine, polycaprolactone polyalkylamine, polycarbonate polyalkylamine, polyether polyalkylamine, polyester polyalkylamine, polyacrylic polyalkylamine, and a mixture thereof; and (10c) at least a chain extender selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl) ethylenediamine, and a mixture thereof; and (10d) at least a functional siloxane reactant having a plurality of reactive groups, wherein said reactive group is selected from the group consisting of amino, carbinol, silanol, hydride, vinyl, isocyanato and a mixture thereof.

8. The composite of claim 3, wherein said interpenetrating polymer network material is phase separated and comprises: (35a) at least a polyfunctional reactant; (35b) a fluoroolefin polymer powder selected from the group consisting of tetrafluoroethylene, hexafluoropropylene, hexafluoroisobutylene, vinylidene fluoride, difluoroethylene, trifluoroethylene, 3,3,3-trifluoropropene, 2,3,3,3-tetrafluoropropene, 1,2,3,3,3-pentafluoropropene, chlorotrifluoroethylene, perfluoroalkyl vinyl ether, hexafluoropropylene oxide, hydropentafluoropropylene, perfluoromethyl vinyl ether, perfluoromethoxyvinyl ether, perfluoropropyl vinyl ether, perfluoroalkylethyl methacrylate, perfluoroalkylethyl acrylate, and a mixture thereof; (35c) a polyisocyanate selected from the group consisting of monomeric diisocyanate, oligomeric polyisocyanate, polyfunctional isocyanate prepolymer, and a mixture thereof; (35d) a catalyst selected from the group consisting of tertiary amine, organometallic complex, and a mixture thereof; and (35e) a solvent.

9. The composite of claim 8, wherein said polyfunctional reactant is selected from the group consisting of fluorinated telechelic polyol, fluorinated pendant polyol and a mixture thereof.

10. The composite of claim 8, wherein said polyfunctional reactant comprises: (37a) at least a fluorinated polyol selected from the group consisting of fluorinated telechelic polyol, fluorinated pendant polyol, and a mixture thereof; (37b) at least an aliphatic polyfunctional reactant selected from the group consisting of aliphatic polyol, aliphatic polyalkylamine, and a mixture thereof, wherein said aliphatic polyol is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether) glycol, castor polyol, vegetable polyol, and a mixture thereof, and wherein said aliphatic polyalkylamine is selected from the group consisting of polyaspartic ester amine, aldimine, polycaprolactone polyalkylamine, polycarbonate polyalkylamine, polyether polyalkylamine, polyester polyalkylamine, polyacrylic polyalkylamine, and a mixture thereof; and (37c) at least a chain extender selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl) ethylenediamine, and a mixture thereof.

11. The composite of claim 8, wherein said polyfunctional reactant comprises: (38a) at least a fluorinated polyol selected from the group consisting of fluorinated telechelic polyol, fluorinated pendant polyol, and a mixture thereof; and (38b) at least a functional siloxane reactant having a plurality of reactive groups, said reactive group is selected from the group consisting of amino, carbinol, silanol, hydride, vinyl, isocyanato and a mixture thereof.

12. The composite of claim 8, wherein said polyfunctional reactant comprises: (39a) at least a fluorinated polyol selected from the group consisting of fluorinated telechelic polyol, fluorinated pendant polyol, and a mixture thereof; (39b) at least an aliphatic polyol selected from the group consisting of polyether polyol, polyester polyol, acrylic polyol, polycaprolactone polyol, polycarbonate polyol, polybutadiene polyol, polysulfide polyol, polyethylene glycol, polypropylene glycol, poly(tetramethylene ether) glycol, castor polyol, vegetable polyol, and a mixture thereof; (39c) at least a chain extender selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl) ethylenediamine and mixture thereof; and (39d) at least a functional siloxane reactant having a plurality of reactive groups, said reactive group is selected from the group consisting of amino, carbinol, silanol, hydride, vinyl, isocyanato and a mixture thereof.

* * * * *